US 12,404,823 B2

United States Patent
Graham et al.

(10) Patent No.: US 12,404,823 B2
(45) Date of Patent: Sep. 2, 2025

(54) ROCKET INJECTOR SUBSCALE STABILITY ASSESSMENT WITH TELESCOPING PISTON

(71) Applicant: Blue Origin Manufacturing, LLC, Huntsville, AL (US)

(72) Inventors: Owen Graham, Issaquah, WA (US); Warren Lamont, Seattle, WA (US); James Sisco, Goffstown, NH (US)

(73) Assignee: Blue Origin Manufacturing, LLC, Huntsville, AL (US)

( * ) Notice: Subject to any disclaimer, the term of this patent is extended or adjusted under 35 U.S.C. 154(b) by 0 days.

(21) Appl. No.: 18/510,495

(22) Filed: Nov. 15, 2023

(65) Prior Publication Data
US 2024/0218845 A1    Jul. 4, 2024

Related U.S. Application Data

(60) Provisional application No. 63/477,633, filed on Dec. 29, 2022.

(51) Int. Cl.
  *F02K 9/52* (2006.01)
  *F02K 9/42* (2006.01)
  (Continued)

(52) U.S. Cl.
  CPC .............. *F02K 9/52* (2013.01); *F02K 9/42* (2013.01); *F02K 9/64* (2013.01); *F02K 9/86* (2013.01);
  (Continued)

(58) Field of Classification Search
  CPC ..... F02K 9/52; F02K 9/64; F02K 9/86; F02K 9/96; F02K 9/978; F02K 9/42; G01M 15/14
  See application file for complete search history.

(56) References Cited

U.S. PATENT DOCUMENTS

| 3,130,544 A | 4/1964 | Penza |
| 3,150,485 A * | 9/1964 | Hickerson ................. F02K 9/86 |
| | | 60/260 |

(Continued)

FOREIGN PATENT DOCUMENTS

| CN | 102072046 B | 5/2013 |
| CN | 105201689 A | 12/2015 |

(Continued)

OTHER PUBLICATIONS

Pavli, A. J. Design and Evaluation of High Performance Rocket Engine Injectors for Use With Hydrocarbon Fuels, 1979, JANNAF Combustion Conference (Year: 1979).*

(Continued)

*Primary Examiner* — Kyle Robert Thomas
(74) *Attorney, Agent, or Firm* — Knobbe, Martens, Olson & Bear, LLP

(57) ABSTRACT

Systems and methods for subscale testing of rocket engine injector stability. The system includes a combustion chamber and a piston within the chamber that is continuously axially moveable via an actuator. An annular gap between the piston and a chamber sidewall provides a minimal cross-sectional flow area. A modular injector plate comprises one or more injector elements configured to inject a fuel and an oxidizer into the chamber. The piston is continuously translated, to thereby continuously vary a combustion volume of the chamber and to create a dynamically tunable downstream boundary. The injector elements are thus exposed to acoustic modes of varying frequency, covering the range of acoustic modes expected in a full scale rocket engine. The injector plate is removably attached to an upstream end of the chamber for replacement of the first injector elements with different, second injector elements for subsequent testing.

22 Claims, 18 Drawing Sheets

(51) Int. Cl.
  *F02K 9/64* (2006.01)
  *F02K 9/86* (2006.01)
  *F02K 9/96* (2006.01)
  *F02K 9/97* (2006.01)
  *G01M 15/14* (2006.01)

(52) U.S. Cl.
  CPC ............ *F02K 9/96* (2013.01); *F02K 9/97* (2013.01); *F02K 9/978* (2013.01); *G01M 15/14* (2013.01)

(56) References Cited

U.S. PATENT DOCUMENTS

| | | | | |
|---|---|---|---|---|
| 3,330,116 A | * | 7/1967 | Ellis | F02K 9/96 60/258 |
| 3,462,950 A | * | 8/1969 | Chevalaz | F02K 9/52 60/741 |
| 6,711,901 B1 | * | 3/2004 | Canfield | C23C 30/00 60/770 |
| 9,759,163 B2 | | 9/2017 | Indersie et al. | |

FOREIGN PATENT DOCUMENTS

| | | |
|---|---|---|
| CN | 105179107 B | 3/2017 |
| CN | 105332822 B | 9/2017 |
| CN | 107461277 A | 12/2017 |
| CN | 110307987 B | 7/2020 |
| CN | 110821713 B | 3/2021 |
| CN | 111927653 B | 7/2021 |

OTHER PUBLICATIONS

Salmi, Bryce, The World's Largest 3D Metal Printer Is Churning Out Rockets, Oct. 25, 2019, IEEE Spectrum (Year: 2019).*

Morgan et al. NASA, Longitudinal Instability Limits with a Variable-length, Lewis Research Center, Cleveland OH 44135, National Aeronautics and Space Admin, Washington DC, Apr. 1971, 23 pages.

Yu et al., Spontaneous Longitudinal Combustion Inst., Journal of Propulsion and Power, vol. 28, No. 5, ages 876-887, Sep. 2012, 22 pages.

Graham et al., Thermo-Acoustic Analysis of a Realistic Liquid-Fueled GT Combustor, Jun. 2019, ASME Turbo Expo 2019, 4 pages.

Sankaran et al., AFRL's ALREST Physics-Based Combustion Stability Program, Nov. 8, 2021, 33 pages.

Battista el at., Single-injector LOX/GC4 combustion chambers, May 2014, Space Propulsion Conference 2014, vol. 2969330, https://www.researchgate.net/publication/265211853_Single-injector_LOXGCH4_combustion_chambers_manufacturing_and_experimental_characterization_in_the _framework_of_the_HYPROB-BREAD_project?channel=doi&linkId=54057e7c0cf2c48563b14cf5&showFulltext=true.

* cited by examiner

ROCKET INJECTOR SUBSCALE STABILITY ASSESSMENT WITH TELESCOPING PISTON

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. For example, this application claims the benefit of U.S. Provisional Application No. 63/477,633, filed on Dec. 29, 2022, titled SUBSCALE STABILITY ASSESSMENT OF ROCKET ENGINE INJECTORS, the entire contents of which is incorporated by reference herein and forms a part of this specification for all purposes.

BACKGROUND

Field

The development relates generally to rocket engines, in particular to subscale testing of rocket engine injector stability.

Description of the Related Art

Combustion stability of rocket engine injectors is critical for engine performance. However, combustion stability is poorly understood and lacks predictive analytic models. Further, stability is a system level phenomenon and is thus a function of full-scale engine combustion chamber modes. Stability issues therefore often only become apparent during full-scale tests, where iteration on designs is costly and time-consuming, along with placing risk on other engine components. Conventional subscale testing capabilities of rocket injectors are limited and do not produce sufficient stability assessment of full-scale performance. Improvements to these and other drawbacks of existing solutions for subscale testing of injector stability are therefore desirable.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods for subscale testing of injector stability.

The following disclosure describes non-limiting examples of some embodiments. For instance, other embodiments of the disclosed systems and methods may or may not include the features described herein. Moreover, disclosed advantages and benefits may apply only to certain embodiments of the invention and should not be used to limit the disclosure.

Systems, devices, and methods are described for subscale testing of rocket engine injector stability. The system includes a combustion chamber and a piston within the chamber that is continuously axially moveable by an actuator. An annular gap between the piston and chamber sidewall provides a minimal cross-sectional flow area. A cross-sectional area of the flow path in the downstream direction may decrease to a minimum at the annular gap about the piston and then increase. A modular injector plate comprises one or more first rocket engine injector elements configured to inject one or more propellants into the chamber. The piston is continuously translated to thereby continuously vary a combustion volume of the chamber and to create a dynamically tunable downstream boundary. The injector elements are thus exposed to acoustic modes of varying frequency, covering the range of acoustic modes expected in a full scale rocket engine. The injector plate is removably attached to an upstream end of the chamber for replacement of the first injector elements with different, second injector elements for subsequent testing. Sensors in the chamber detect the acoustic responses. A cavity ring forming part of the chamber may be replaceable for testing various components and parameters, such as film cooling, alternative cavity ring designs, etc. Particular aspects and embodiments thereof are summarized below, followed by detailed discussion of these and other features.

In one aspect, a system for subscale testing of rocket injector stability is described. The system comprises a chamber, an injector plate, and a piston. The chamber has a sidewall extending axially. The injector plate is removably attached to an upstream end of the chamber. The injector plate comprises one or more injector elements configured to inject one or more propellants into the chamber. The injector plate is one of a plurality of different injector plates configured to be removably attached to the chamber. The piston is positioned at least partially within the chamber. The piston is continuously moveable in an axial direction to continuously vary a combustion volume of the chamber located between the injector plate and an upstream end of the piston.

Various embodiments of the various aspects may be implemented. In some embodiments, the upstream end of the piston is rounded. In some embodiments, the system further comprises an actuator configured to axially move the piston. In some embodiments, the piston further comprises a cooling channel. In some embodiments, the system further comprises a shell at the upstream end of the piston, wherein the cooling channel extends between the shell and the piston. In some embodiments, the system further includes a shell at the upstream end of the piston. The shell and the piston may be monolithic. In some embodiments, the piston and the sidewall of the chamber define a gap therebetween. In some embodiments, the gap is an annular gap. In some embodiments, the piston increases in cross-sectional area in the downstream direction from an upstream end of the piston to a maximum cross-sectional area at the annular gap. In some embodiments, the piston decreases in cross-sectional area in the downstream direction from the annular gap. In some embodiments, the system further comprises a sensor configured to detect a pressure within the combustion volume. In some embodiments, the system further comprises a replaceable cavity ring forming part of the sidewall of the chamber.

In another aspect, a subscale rocket injector stability test system includes a chamber, a modular injector plate, and a piston. The modular injector plate is coupled to the chamber and comprises one or more injector elements. The piston is positioned at least partially within the chamber and is configured to move to vary a combustion volume of the chamber. The piston and a sidewall of the chamber define an annular flow path around the piston configured to act as a chokepoint allowing exhaust to exit the chamber.

Various embodiments of the various aspects may be implemented. In some embodiments, an end of the piston facing the combustion volume is bulbous. In some embodiments, the piston further comprises a cooling channel extending at least partially within an extension rod coupled to the piston and at least partially within the piston. In some embodiments, the chamber is cylindrical. In some embodiments, a volume defined between the piston and the sidewall defines an inverted nozzle shape. In some embodiments, the system further comprises an actuator configured to axially move the piston to continuously vary the combustion volume.

In another aspect, a method of subscale testing rocket injector stability includes injecting into a combustion chamber one or more propellants from one or more injector elements supported by a modular injector plate to cause combustion, continuously moving a piston within the combustion chamber to continuously vary a combustion volume within the chamber, and detecting data from within the combustion volume as the piston moves.

Various embodiments of the various aspects may be implemented. In some embodiments, the method further includes flowing a coolant through a cooling channel within the piston. In some embodiments, the method further includes replacing the injector plate with a different injector plate supporting one or more different injector elements. In some embodiments, the method further includes flowing exhaust from the combustion through an annular gap located between the piston and a sidewall of the chamber. In some embodiments, the method further includes analyzing the acoustic data to assess the stability of the one or more injectors.

In another aspect, a system for subscale testing of rocket injector stability includes a chamber, a throat, and an injector plate. The chamber has a sidewall extending axially. The throat is at a downstream end of the chamber. The injector plate is removably positioned at an upstream end of the chamber. The injector plate includes one or more injector elements configured to inject one or more propellants into the chamber. The injector plate is one of a plurality of different injector plates configured to be removably attached to the chamber. The injector plate is continuously moveable in an axial direction to continuously vary a combustion volume of the chamber located between the injector plate and the throat.

Various embodiments of the various aspects may be implemented. In some embodiments, a positioning of the throat remains fixed. In some embodiments, the system includes an actuator configured to axially move the injector plate. In some embodiments, the throat has an inner dimeter that decreases from a first inner diameter to a second inner diameter in an upstream direction and increases from the second inner diameter to a third inner diameter in the upstream direction. In some embodiments, the system includes a sensor configured to detect pressure within the combustion chamber. In some embodiments, the throat defines a converging-diverging nozzle shape.

In another aspect, a subscale rocket injector stability system includes a chamber, an injector plate, and a telescoping throat. The injector plate is removably attached to an upstream end of the chamber. The injector plate includes one or more injector elements configured to inject one or more propellants into the chamber. The injector plate is one of a plurality of different injector plates configured to be removably attached to the chamber. The telescoping throat is positioned at a downstream end of the chamber. The telescoping throat is continuously moveable in an axial direction to continuously vary a combustion volume of the chamber located between the injector plate and an upstream end of the telescoping throat.

Various embodiments of the various aspects may be implemented. In some embodiments, in some embodiments the telescoping throat is positioned within the chamber. In some embodiments, a sidewall of the telescoping throat is positioned external to the chamber. In some embodiments, the system includes a first actuator configured to axially move the telescoping throat. In some embodiments, the system includes a second actuator configured to axially move the telescoping throat. The first and second actuator moving the telescoping throat simultaneously. In some embodiments, the telescoping throat includes a cooling channel. In some embodiments, the telescoping throat defines a converging-diverging nozzle shape. In some embodiments, in a downstream direction the telescoping throat has a first inner diameter that decreases to a second inner diameter and the second inner diameter increases to a third diameter. In some embodiments, the system includes a sensor configured to detect a pressure within the combustion volume.

In another aspect, a method of subscale testing rocket injector stability includes injecting into a combustion chamber one or more propellants from one or more injector elements supported by a modular injector plate to cause combustion, continuously varying a combustion volume within the combustion chamber, and detecting acoustic data from within the combustion volume as the combustion volume is varied.

Various embodiments of the various aspects may be implemented. In some embodiments, continuously varying the combustion volume comprises continuously moving an external telescoping throat positioned at a downstream end of the combustion chamber. In some embodiments, continuously varying the combustion volume comprises continuously moving the modular injector plate. In some embodiments, continuously varying the combustion volume comprises continuously moving an internal telescoping throat through the combustion chamber. In some embodiments, the method includes replacing the modular injector plate with a different injector plate supporting one or more different injector elements.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings. In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawing, may be arranged, substituted, combined, and designed in a wide variety of different configurations, all of which are explicitly contemplated and make part of this disclosure.

DETAILED DESCRIPTION

The following detailed description is directed to certain specific embodiments for devices, systems, and methods related to testing the stability of subscale rocket injectors. In this description, reference is made to the drawings wherein like parts or steps may be designated with like numerals throughout for clarity. Reference in this specification to "one embodiment," "an embodiment," or "in some embodiments" means that a particular feature, structure, or characteristic described in connection with the embodiment is included in at least one embodiment of the invention. The appearances of the phrases "one embodiment," "an embodiment," or "in some embodiments" in various places in the specification are not necessarily all referring to the same embodiment, nor are separate or alternative embodiments necessarily mutually exclusive of other embodiments. Moreover, various features are described which may be exhibited by some embodiments and not by others. Similarly, various requirements are described which may be requirements for some embodiments but may not be requirements for other embodiments. Reference will now be made in detail to embodiments of the invention, examples of which are illustrated in the accompanying drawings. Wherever possible, the same reference numbers will be used throughout the drawings to refer to the same or like parts.

A typical subscale testing system will have different acoustic modes than a full scale engine. This can be due to the flame and/or injector response not being coupled with acoustic modes across a range of frequencies. The subscale stability test systems and methods according to the present disclosure allow for understanding the acoustic response across a continuous range of frequencies using a continuously variable chamber volume, as further described.

Figure 1A:
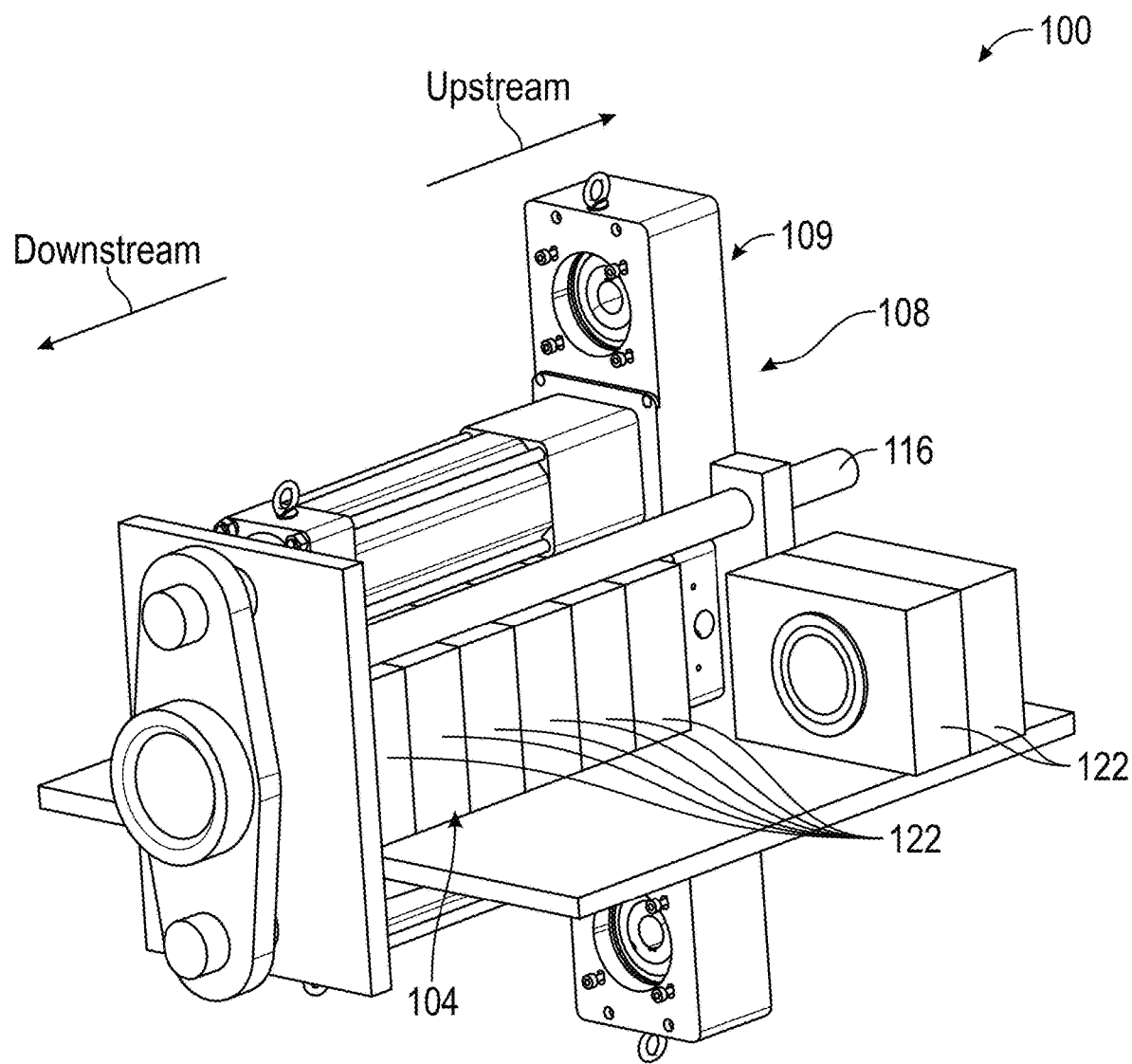
FIG. 1A is a perspective view of an embodiment of a subscale system for testing the stability of rocket injectors having a modular injector plate and continuously variable volume combustion chamber.
Figure 1B:
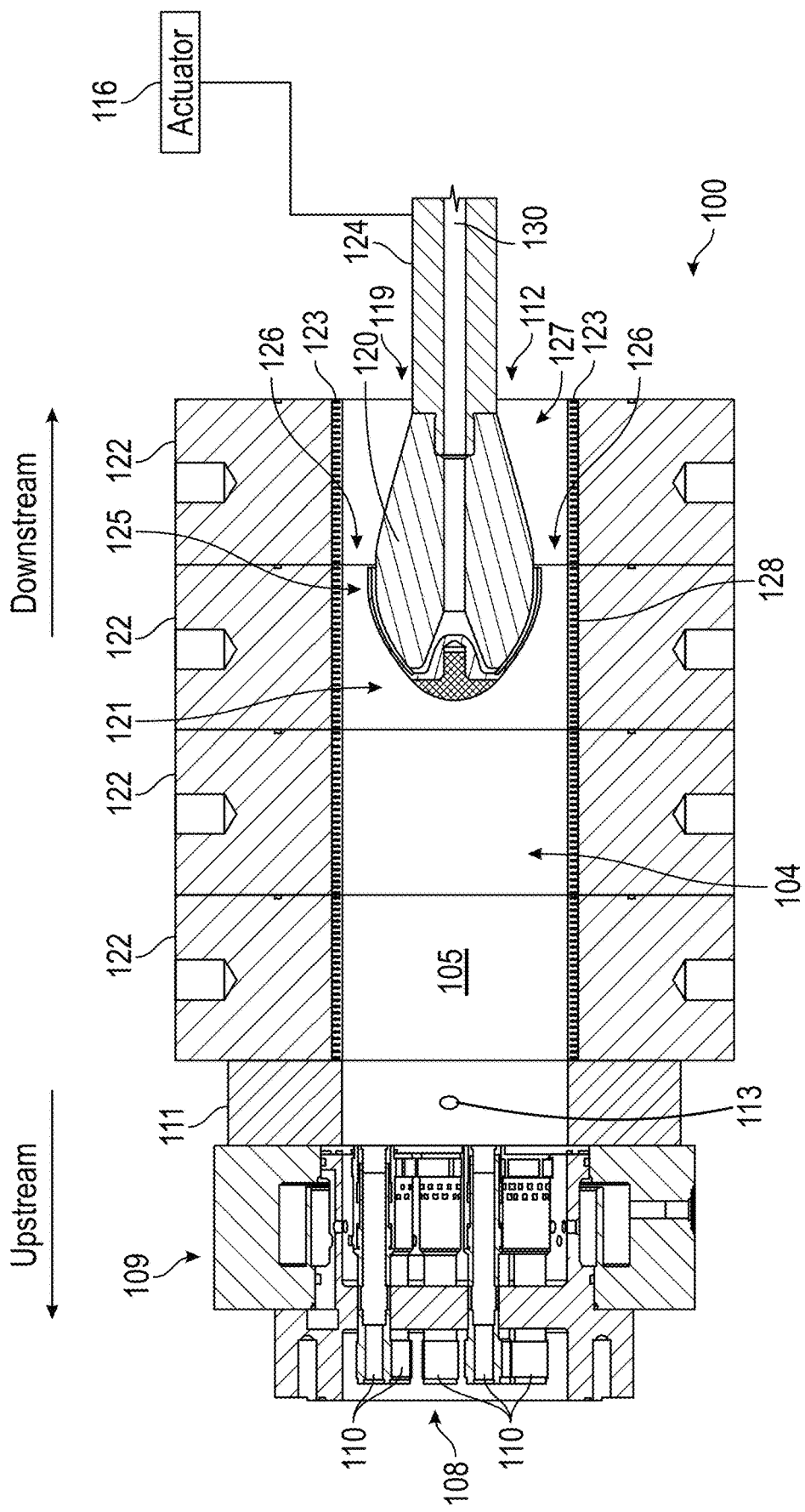
FIG. 1B is a cross-sectional side view of an embodiment of a subscale system for testing the stability of rocket injectors having a modular injector plate and continuously variable volume combustion chamber with an axially moveable rounded piston.

FIG. 1A is a perspective view of an embodiment of a subscale system 100 for testing the stability of rocket injectors. FIG. 1B is a cross-sectional side view of a portion of the subscale system 100. The system 100 and other embodiments herein may be used to easily and quickly replace and test different injectors and to expose the injectors to acoustic modes of varying frequency that may cover the range of acoustic modes expected in a full scale engine. This may be done by continuously varying the volume of a combustion chamber during testing. Such variation in volume may be achieved by continuously moving a piston within the chamber, by continuously moving an injector plate within the chamber, continuously moving an internal telescoping throat within the chamber, and/or continuously moving an external telescoping throat around the chamber. This provides for a number of benefits, including but not limited to, more efficient and quick testing, more accurate testing, and more cost-effective testing. Additionally, it eliminates the risk to other engine components that is present in full-scale engine testing.

The system 100 may thus provide a combustion rig facility with a dynamically tunable downstream combustor and a modular injector interface. The modular interface allows multiple injector concepts to be quickly tested and assessed. The dynamically tunable downstream boundary enables the injector to be exposed to acoustic modes of varying frequency, covering the range of acoustic modes expected in a full scale engine. This allows the injector's stability characteristics to be screened without requiring a full scale engine test.

The systems described herein thus overcome drawbacks of prior solutions to injector stability testing, such as traditional subscale test rigs producing different acoustic modes than a full scale engine, which may be due to the flame and/or injector response not being coupled with acoustic modes across a range of frequencies. Further, combustion stability is poorly understood, and lacks accurate, predictive analytical models. Due to stability being a system level phenomenon (i.e., a function of full-scale engine combustion chamber modes), stability issues often only become apparent during full-scale tests, where iteration on designs is costly and time-consuming, along with placing risk on other engine components. Traditional subscale test rigs are not considered useful to assess combustion stability due to fixed chamber dimensions that often correspond to acoustic modes which differ from all or some full scale combustor modes. Previous methods that have been studied introduce a driving signal of varying frequency using a siren. Another traditional alternative is to defer all stability testing to full-scale testing, with the inherent risk to cost and schedule that entails. All of these previous approaches do not sufficiently serve the industrial need to quickly and accurately screen and down-select injector concepts.

Traditional approaches do not utilize common hardware and expose injectors to acoustic modes. In contrast, a longitudinal approach is the only subscale approach that supports a common set of combustor hardware regardless of the propellants, injector type, or operating conditions and subjects the injector to acoustic modes.

The continuously tunable nature of the systems according to the present disclosure overcome these and other limitations. The system according to the present disclosure exposes the injector to all possible frequencies within the tunable range of the rig, thus effectively characterizing the stability response of the injector. The systems described herein further offer an effective component-level solution for characterizing stability and screening injector designs without requiring or risking other engine components, resulting in reduced cost and schedule for engine development programs. The systems described herein also reduce cost and risk for any new engine programs and allow design cycle times to be reduced. By rapidly screening multiple injector concepts at the component level, design iterations can happen much faster with the systems described herein and are decoupled from waiting for the readiness of other full-scale components. More technically ambitious designs can thus be pursued. The final full-scale engine test campaign can be approached having considerably reduced the risk of stability uncertainty.

As shown in FIG. 1B, the system 100 may have a combustion chamber 104. The system 100 may include an injector plate 108 removably attached at an upstream end of the combustion chamber 104. The system 100 may include a moveable piston 112 located downstream from the injector plate 108. As shown in FIG. 1A, "upstream" refers to a direction generally to the right and into the page of the figure as oriented, and "downstream" refers to a direction of movement of exhaust which is generally to the left and out of the page as oriented. As shown in FIG. 1B, "upstream" refers to a direction generally to the left in the figure as oriented, and "downstream" refers to a direction of movement of exhaust which is generally to the right as oriented.

The injector plate 108 may be a structural holder configured to carry a single or plurality of injector elements 110. The injector plate 108 may be metallic. The injector plate 108 may be generally cylindrically shaped. In some embodiments, the injector plate 108 may be modular. For example, the injector plate 108 may be one among a plurality of different injector plates that may be attached to the system 100. In some embodiments, the injector plate 108 may be attached via a manifold 109. The manifold 109 may be a structural component configured to attach with the injector plate 108. The manifold 109 may have an annular shape with an opening therethrough configured to partially receive the injector plate 108 therein. The injector plate 108 may have a reduced width, downstream portion received within the manifold 109. In some embodiments, the system 100 may not include the manifold 109.

The injector elements 110 may be configured to inject one or more propellants, such as a fuel and an oxidizer, into the combustion chamber 104. In embodiments where the injector plate 108 has a single injector element 110, a second injector element 110 may be located elsewhere in the system, such as adjacent to the injector plate 108. Each injector element 110 may inject a fuel or an oxidizer. The injector plate 108 may comprise one or more first injector elements 110 having a first set of injection characteristics, and the injector plate 108 may be removed and replaced with a second, different injector plate comprising one or more second injector elements having a second, different set of injection characteristics relative to the first injector elements 110. The first and second sets of injector elements 110 may have different lengths, widths, volumetric flow, flow channel configurations, etc. In some embodiments, the injector elements 110 may have differing arrangements and operations (e.g., shear coaxial, swirl, impinging, pintle). The injector elements 110 may have different mixture ratios of propellants. Each injector plate 108 may hold one, two, three, four, five, six, seven, eight, nine, ten, or more of the injector elements 110.

In some embodiments, the injector elements 110 may extend beyond the injector plate 108 and into the combustion chamber 104 (e.g., such as baffle elements). In some embodiments, the injector elements 110 may be recessed from the injector plate 108 such that the initial propellant interactions occur within the injector recess. In some embodiments, the injector plate 108 and/or the injector elements 110 may incorporate cavities to provide a damping function.

The injector plate 108 may thus be interchangeable. Any number of different injector plates 108 may be configured to be attached to the combustion chamber 104 for testing. This allows for the testing of various injector plates 108 using a single testing system 100. A first injector plate 108 may be tested and once testing is a complete, the first injector plate 108 may be removed and the second injector plate may be attached, which may be tested and removed, and then a third injector plate may be attached, etc. In some embodiments, the various injector plates may have similar connecting structures for attaching to the same system 100, for example to the manifold 109. In some embodiments, the first injector plate 108 may have different internal attachments from a second injector plate, such that the two injector plates each receive different injectors. In some embodiments, the first injector plate 108 may have one or more first injector elements 110 removed and replaced by one or more second injector elements 100 that are different from the first injector elements and are installed into the same first injector plate 108. Thus, the same injector plate 108 may be used for testing different injector elements 110.

In some embodiments, the system 100 may have an interchangeable cavity ring 111. The ring 111 may form part of the combustion chamber 104. The ring 111 may extend annularly around the chamber 104. The ring 104 may be metallic. A radially inner surface of the ring 111 may be generally cylindrical. The ring 111 may be axially positioned between the injector plate 108 or manifold 109 and the piston 112. "Axial" may be in directions parallel to a central axis as defined by a circularly shaped chamber 104. The interchangeable ring 111 may be configured to provide a damping function. The interchangeable ring 111 may be configured to provide thermal protection or prevent melting or damage to the injector plate 108. In some embodiments, the interchangeable ring 111 may be used to test film cooling and/or identify local injector extinction events. Rings 111 of different sizes may be used. For example, the thickness or material of the interchangeable ring 111 may be changed. In some embodiments, the system 100 may not include the ring 111.

In some embodiments, the ring 111 can be a simple annulus. The ring 111 can be configured to conduct flow to the downstream portion of the system 100. In some embodiments, the ring 111 can include additional components. For example, the ring can include stability aids (e.g., acoustic cavities and bias flow elements), igniters, pulse-guns, and instrumentation such as thermocouples, high-speed pressure transducers, and optical measurements.

The combustion chamber 104 may be cylindrical and have a sidewall 128 extending axially. The sidewall 128 may be metallic. The sidewall 128 may define a cylindrical inner surface and extend from an upstream end to a downstream end. An upstream end of the sidewall 128 may attach to or be adjacent the cavity ring 111 and/or the manifold 109. The downstream end of the chamber 104 may be open, except for the piston therein, to allow exhaust to exit the combustion chamber 104 at the exit 119.

The combustion chamber 104 may have a diameter of about 3 inches, about 4 inches, about 5 inches, about 6 inches, about 7 inches, about 8 inches, or more or any values in between. The combustion chamber 104 may be at least partially formed by one or more plates 122. Examples plates 122 removed from the system 100 are visible in FIG. 1A. The plates 122 may have a constant inner diameter to produce a constant inner diameter of the combustion chamber 104. In some embodiments, the plates 122 may comprise varying diameters to form a combustion chamber with varying diameters. For example, a first plate 122 may have a first diameter and a second plate 122 may have a second diameter that is larger or smaller than the first diameter. Any combination of diameters may be used.

The plates 122 may be structural segments defining an interior cylindrical opening. The plates 122 may be metal, composite, or other suitable materials. The sidewall 128 may be located along the inner surfaces of the plates 122. The sidewall 128 may be formed by the inner surfaces of the plates 122, or the sidewall 128 may be a separate structure attached to the plates 122. There may be one, two, three, four or more plates 122. The axial length of the combustion chamber 104 may be determined by the number of plates 122 and the width of the plates 122. However, the axial length of a region 105 of combustion within the chamber 104 upstream of the piston may be varied, as further described.

The system 100 may include one or more calorimeter bodies 123. The plates 122 forming the combustion chamber 104 may comprise the calorimeter body 123. The calorimeter body 123 may be configured to measure heat flux. For example, water may flow through the calorimeter body 123 to absorb the heat. The calorimeter body 123 may be used to assess the injector performance. The calorimeter body 123 may be within or form the sidewall 128.

The piston 112 may be at least partially located inside the combustion chamber 104. The piston 112 may be inserted at a second downstream end opposite the first upstream end that is attached to the injector plate 108. The piston 112 may be located at least partially upstream of the downstream end of the chamber 104. The piston 112 may include a head 120 at an upstream end thereof. The head 120 may be located within the chamber 104 between the sidewall 128. The head 120 may be located upstream of the downstream end of the chamber 104. The head 120 may be moved axially during testing, as further described.

The combustion chamber 104 may have a combustion volume or region 105 configured to have a variable volume. The region 105 may be located within the combustion chamber 104 upstream of the head 120 of the piston 112 or portions thereof. The region 105 may extend from an upstream end of the chamber 104, such as at the injector plate 108 or manifold 109, to an upstream end 121, a middle portion 125, and/or a downstream end 127 of the piston 112. The volume of the region 105 may be changed by translating the piston 112 in an axial direction within the combustion chamber 104. For example, with reference to the positioning of FIG. 1B, the region 105 of the combustion chamber 104 will reduce in volume when the piston 112 is moved upstream (to the left as oriented) and increase in volume when the piston 112 is moved downstream (to the right as oriented). The relative directions described herein as oriented in the figures are not limiting. For example, in other embodiments, the orientation of the piston 112 and the injector plates 108 may be switched, where the piston 112 is on the left and the injector plate 108 is on the right.

Figure 4:
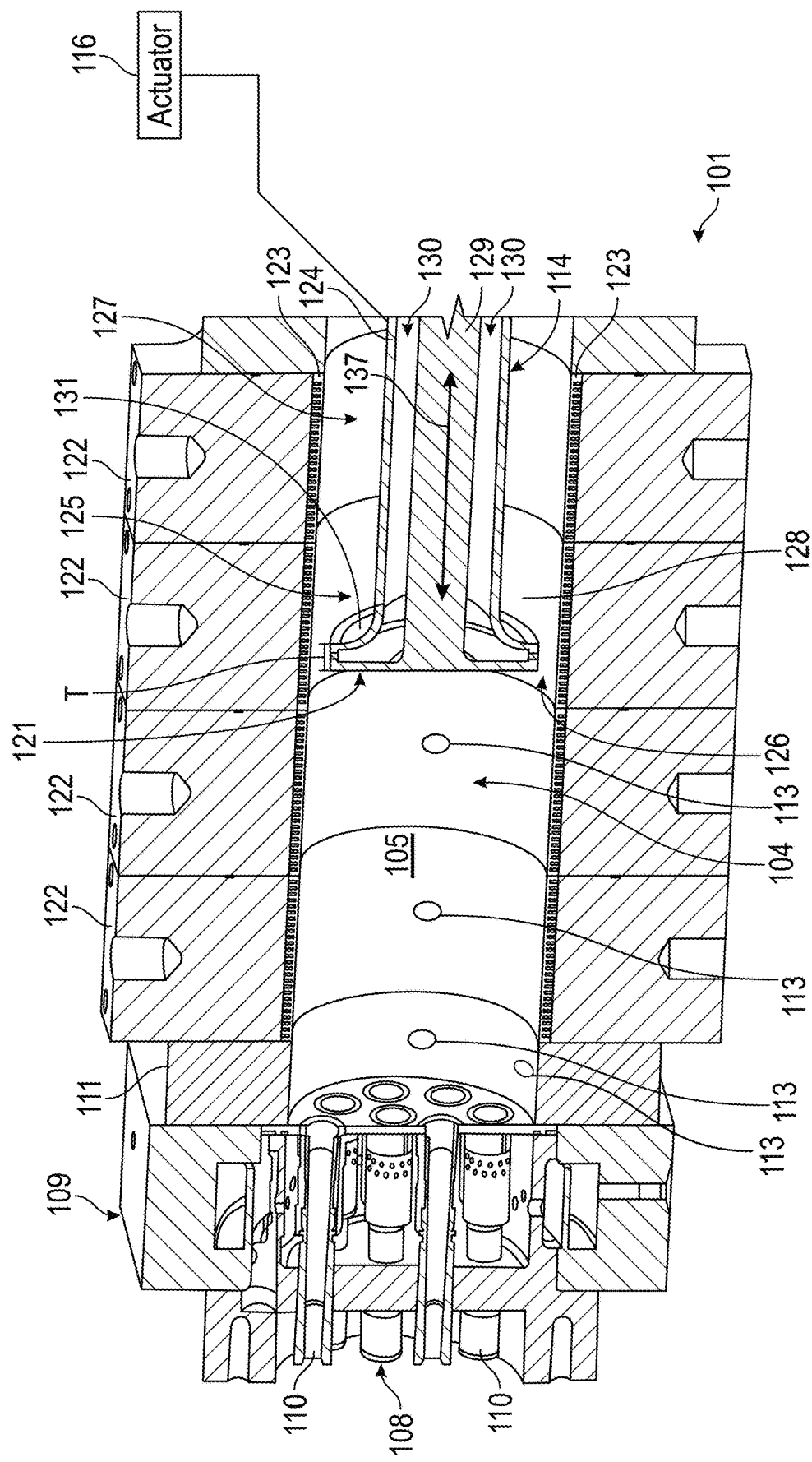
FIG. 4 is a cross-sectional side view of another embodiment of a subscale system for testing the stability of rocket injectors, having a modular injector plate and continuously variable volume combustion chamber, with an axially moveable piston with a planar upstream end.

The system 100 may include an actuator 116, shown schematically in FIGS. 1B and 4. The actuator 116 may be configured to move the piston 112 in axial directions (e.g., left and right as oriented) within the combustion chamber 104. The movement of the piston 112 may continuously vary the volume of the region 105 of the combustion chamber 104. The actuator 116 may be mounted radially to one side of the system 100 in order to avoid damage caused by the exhaust exiting the combustion chamber 104 at the exit 119. The actuator 116 may be a hydraulic actuation system. The actuator 116 may continuously move the piston 112 during testing. By "continuous" it is meant the piston 112 is not limited to discrete locations within the chamber but may move along the chamber 104 for collecting mode data along a continuum. The piston 112 may be translated across a range of about 4 inches to about 60 inches. The range may be from 4 inches to 60 inches. The range may be determined based on screening an injector concept across a frequency range consistent with the natural acoustic modes of the rocket engine injector. The speed of the motion of the piston 112 may be a value which allows a quasi-steady assumption of the operating conditions of the combustion chamber 104 to remain valid. In some embodiments, the speed may be dependent upon the limitations of a test facility. Modes and injector responses may thus be analyzed for combustion volumes of the region 105 having a continuously changing size. In other words, the relationship between axial position of the piston 112 and volume of the region 105 may be generally smooth with no sharp jumps, and with a continuous first derivative across all volumes tested.

In some instances, testing may include rapidly translating the piston 112 over a short distance. This type of testing could create an artificial disturbance, for example an acoustic impulse similar to that which is created from a bomb or pulse gun shot. The results of this testing may be used for determination of stability ratings.

The piston 112 may have an extension rod 124. The head 120 may attach to an upstream end of the rod 124. The rod 124 may be axially elongated and extend between the head 120 and the actuator 116. In some embodiments, the head 120 is replaceable with different shaped and sized heads. In some embodiments, the head 120 and rod 124 are a single, monolithic structure.

The head 120 of the piston 112 may have various shapes. As shown in FIG. 1B, the head 120 may be rounded, for example bulbous. In some embodiments, the head 120 may be flat or planar, for example as shown in FIG. 4. The head 120 may have a variable width to provide a chokepoint within the combustion chamber 104 at an annular gap 126. The annular gap 126 may be a portion of the flow path of the combustion exhaust in an annular, e.g., circular, region defined between the piston 112 and the sidewall 128. The annular gap 126 may be a region of minimal cross-sectional area of the chamber 104. The annular gap 126 may be a location of minimal cross-sectional area between the piston 112 and the sidewall 128.

A cross-sectional area of the combustion flow path within the chamber 104 may be constant in the downstream direction from the injector plate 108 to the upstream end 121 of the head 120 of the piston 112. The cross-sectional area of the flow path may vary axially along the piston head 120. The piston head 120 may have a variable width in the axial direction. In some embodiments, the piston 112 increases in cross-sectional area in the downstream direction from the upstream end 121 of the head 120, to a maximum cross-sectional area at the middle portion 125 that partially defines the annular gap 126. The piston may decrease in cross-sectional area in the downstream direction from the middle portion 125 or annular gap 126 to the downstream end 127. The rate of increase of the cross-sectional area from the upstream end 121 to the middle portion 125 may be greater on an absolute basis as compared to the rate of decrease of the cross-sectional area from the middle portion 125 to the downstream end 127. The axial length between the upstream end 121 and the middle portion 125 may be greater than the axial length from the middle portion 125 to the downstream end 127 as shown.

The size and shape of the annular gap 126 may be adjusted by using different sizes and shapes of the piston head 120. The shape and size of the piston head 120 may be selected to match a desired engine contraction ratio. The engine contraction ratio may be the ratio of the combustion chamber cross sectional area, for example in the combustion region 105 upstream of the piston head 120, to the minimum cross-sectional area of the flow path through the annular gap 126. This region of minimum cross-sectional area may be at the annular gap 126 between the chamber sidewall 128 and the middle portion 125 of the piston head 120.

The cross-sectional area of the combustion flow path in the downstream direction may thus be constant, reduce to a minimum at a chokepoint of the annular gap 126, and then increase. The piston 112 and the sidewall 128 may in some embodiments define a volume having an inverted nozzle shape. The annular gap 126 may act as the chokepoint, such that the system 100 mimics the behavior of a converging-diverging nozzle with a throat. The annular gap 126 may be a location where the flow velocity is Mach 1 or about Mach 1.

The system 100 may include one or more sensors 113. The sensors 113 may be high frequency pressure transducers. The sensors 113 may be mounted at or near the injector plate 108. In some embodiments, the sensors 113 may be positioned at the axial midpoint of the ring 111. The sensors 113 may be positioned circumferentially about the ring 111. In one example non-limiting embodiment, three sensors 113 can be positioned circumferentially at the axial midpoint of the ring at 0 degrees, 135 degrees, and 225 degrees. In some embodiments, there may be a plurality of the sensors 113 distributed annularly about an inner circumference, and/or axially along the axial length of, the sidewall 128 of the combustion chamber 104. In some embodiments, the sensors 113 may be distributed axially in the chamber 104. For example, a sensor 113 may be positioned at an axial midpoint of one or more of the plates 122, as shown in FIG. 4. The sensor 113 may be positioned at the 0 degree position. The sensors 113 may be carried by the ring 111. In some embodiments, the sensors 113 may be positioned on the piston 112. The acoustics resulting from the combustion may bounce back from the head 120 of the piston 112. For example, the head 120 of the piston 112 may act as an acoustic end of the combustion chamber 104. The soundwaves or pressure waves from combustion may reflect from the head 120 of the piston 112. The one or more sensors 113 may detect such acoustic or pressure waves.

Figure 2:
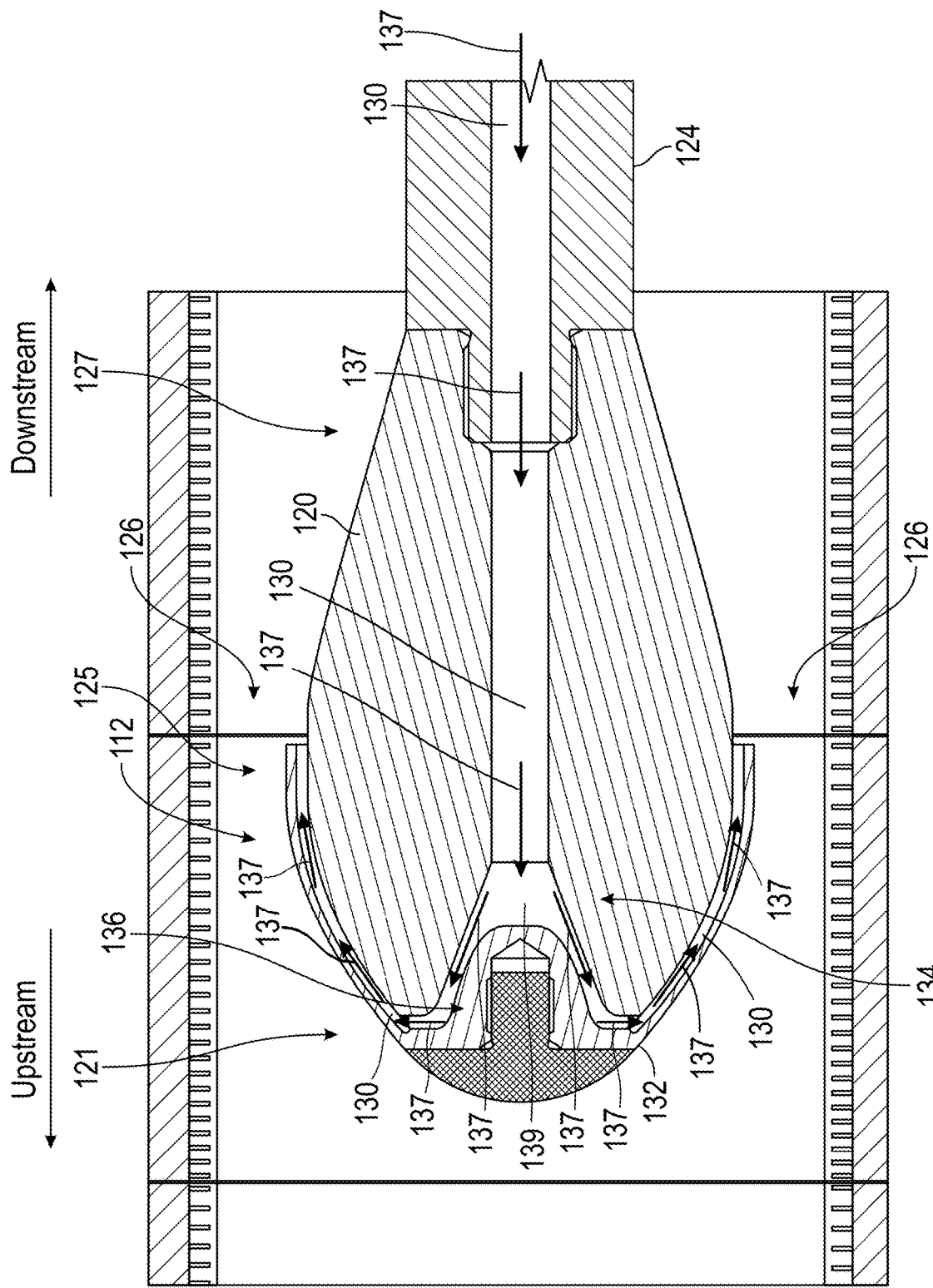
FIG. 2 is a cross-sectional side view of the piston of FIG. 1B having a rounded upstream end and a cooling channel.
Figure 3:
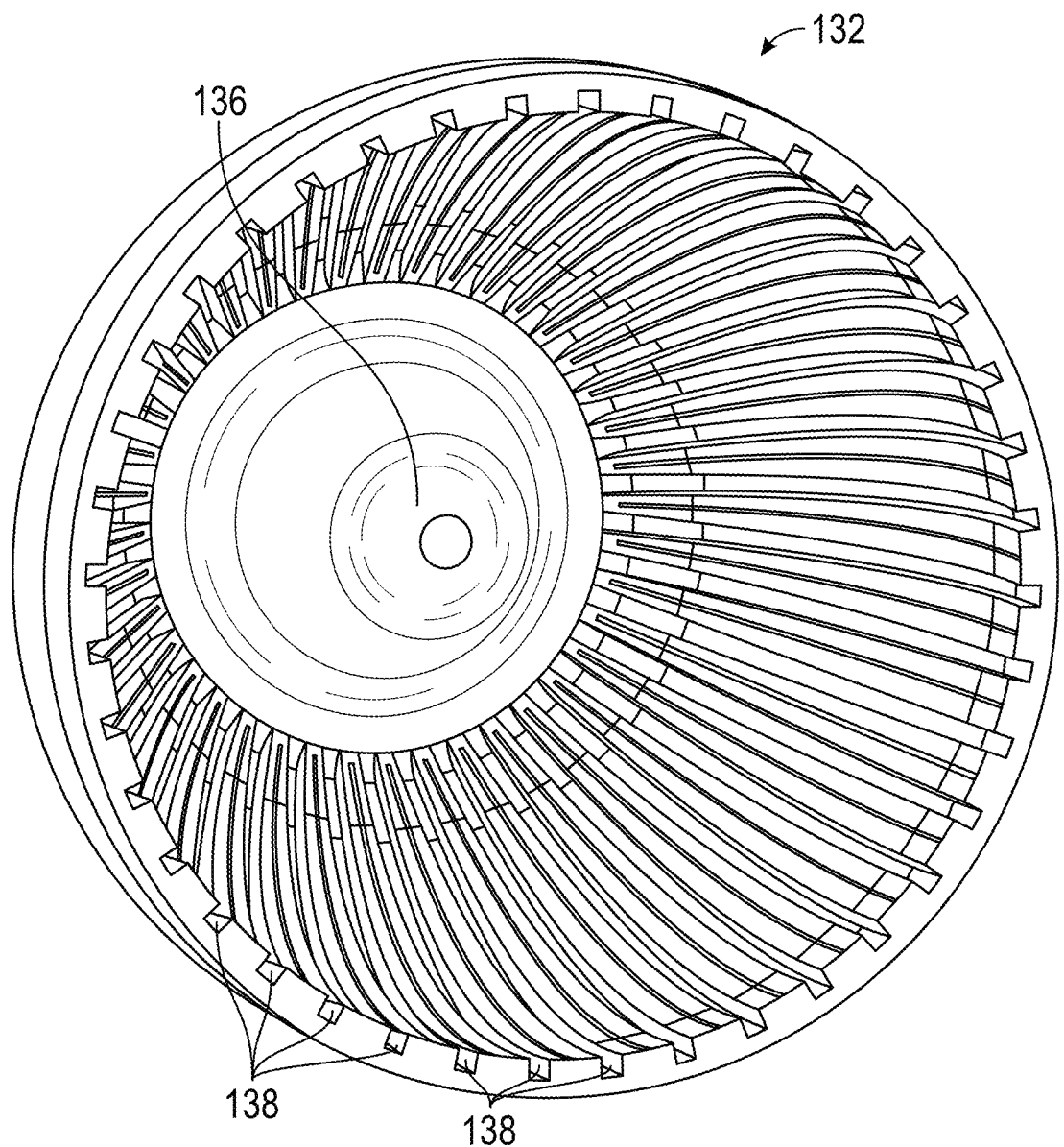
FIG. 3 is a perspective view of a shell that is coupled to an upstream end of the piston of FIG. 1B.

FIG. 2 is a close-up, cross-sectional view of the head 120 of the piston 112 of FIG. 1B having a shell 132. FIG. 3 is a perspective view of the shell 132 in isolation. The shell 132 may be a structural component attached to the upstream end 121 of the piston 112. In some embodiments, the shell 132 and the head 120 may be a monolithic structure. For example, the shell 132 and the head 120 may be additively manufactured as a single, continuous structure. The shell 132 may extend along the upstream end 121, in the downstream direction, and terminate at the middle portion 125 as shown. In some embodiments, the shell 132 may terminate prior to or after the middle portion 125 in the downstream direction. The shell 132 may be a thin-walled structure.

The piston 112 may include a one or more cooling channels 130. The shell 132 may partially define the cooling channels 130. Part of the cooling channels 130 may be formed at the head 120 of the piston 112 by the shell 132, as shown in FIG. 2. The shell 132 may be coupled to the head 120. The head 120 may have a receiving portion 134 which may include an indentation 139 configured to receive a protrusion 136 of the shell 132. The protrusion 136 may extend annularly and in the downstream direction, with the receiving portion 134 defining the indentation 139 that correspondingly extends annularly and in the downstream direction. Coolant may flow through the channels 130 in the direction indicated by the arrows 137.

The cooling channel 130 may extend along a central longitudinal path of the head 120 of the piston 112. The cooling channel 130 may extend from the extension rod 124 to the path within the head 120, and into spaces between the head 120 and the shell 132 and/or within the shell 132, as shown by the arrows 137 in FIG. 2. The cooling channel 130 may be configured to carry a coolant. The coolant may travel through the cooling channel 130 starting in the extension rod 124 and then out the cooling channel 130 between the shell 132 and the head 120 of the piston 112. In some embodiments, the coolant may flow back in the opposite direction of the arrows, e.g. through return channels. In some embodiments, the coolant may exit the head 120, e.g. flow into open air or into additional tubing attached thereto. In some embodiments, the coolant may have a return flow in a direction back through the extension rod 124 (e.g., to the right as oriented in the figure). The head 120 of the piston 112 may define an acoustic boundary and a known contraction ratio. The cooling channel 130 may assist in preventing damage to the piston 112 during use. For example, the cooling channel 130 may prevent or reduce wear and tear on the piston 112, allow for more accurate data to be collected, and/or prevent or reduce the chance of the piston 112 melting due to the heat exposure. Additionally, the cooling channel 130 may be advantageous in that it allows for longer periods of testing with the piston 112 translated during hot fire, which in turn may improve the resolution of frequency screening.

As shown in FIG. 3, the shell 132 may have a plurality of grooves or channels 138 (for clarity, only some of the channels 138 are labelled in FIG. 3). The channels 138 may be grooves on an inner surface of the shell 132. The channels 138 may extend from the open downstream end of the shell 132 toward the protrusion 136 with a depth partially through the thickness of the shell 132. The channels 138 may define terminal portions of the cooling channels 130. There may be ten or more, twenty or more, thirty or more, or forty or more of the channels 138. Flow channels may be defined partially by the channels 138 and the outside surface of the head 120 of the piston 112.

Figure 2A:
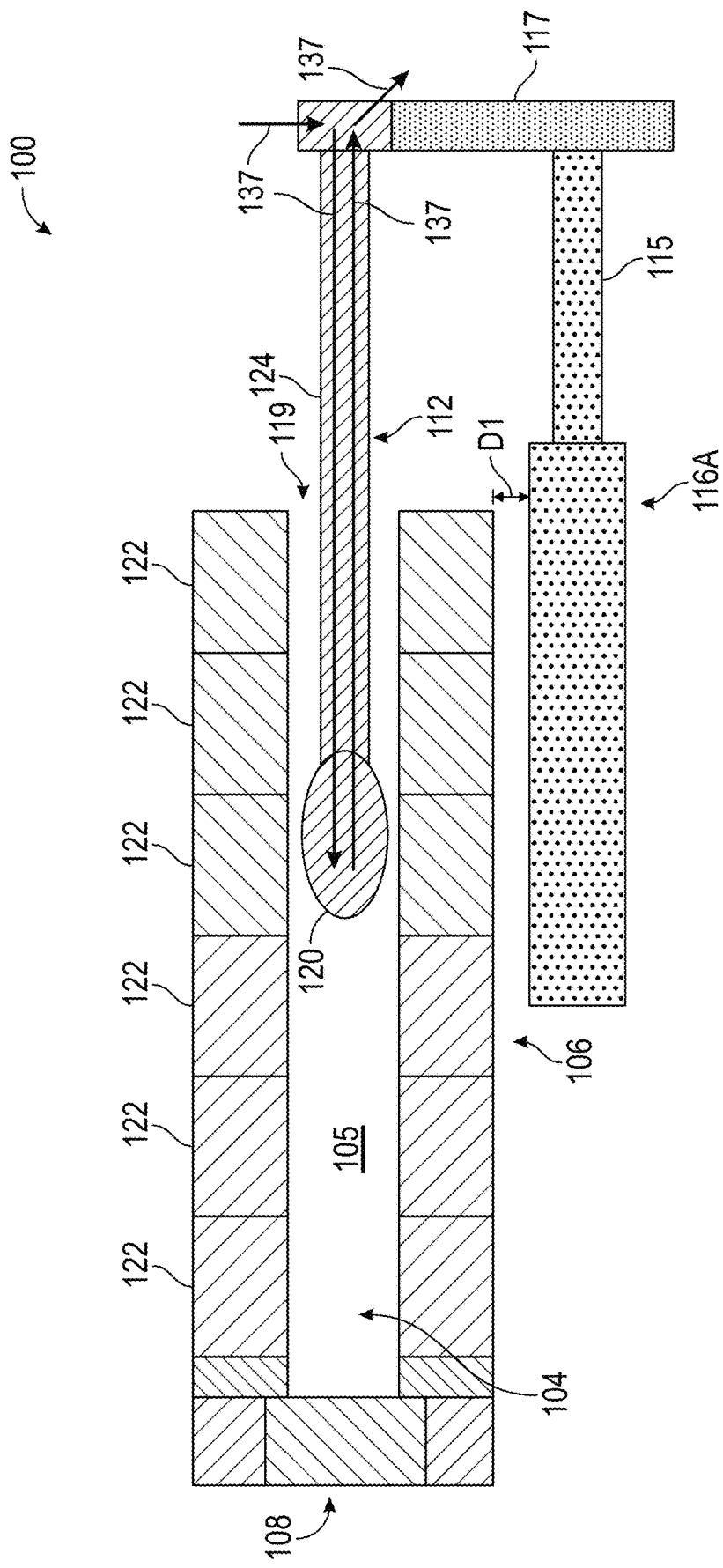
FIG. 2A is a cross-sectional view of an embodiment of a subscale system for testing the stability of rocket injectors having a linear actuator positioned below a combustion chamber.
Figure 2B:
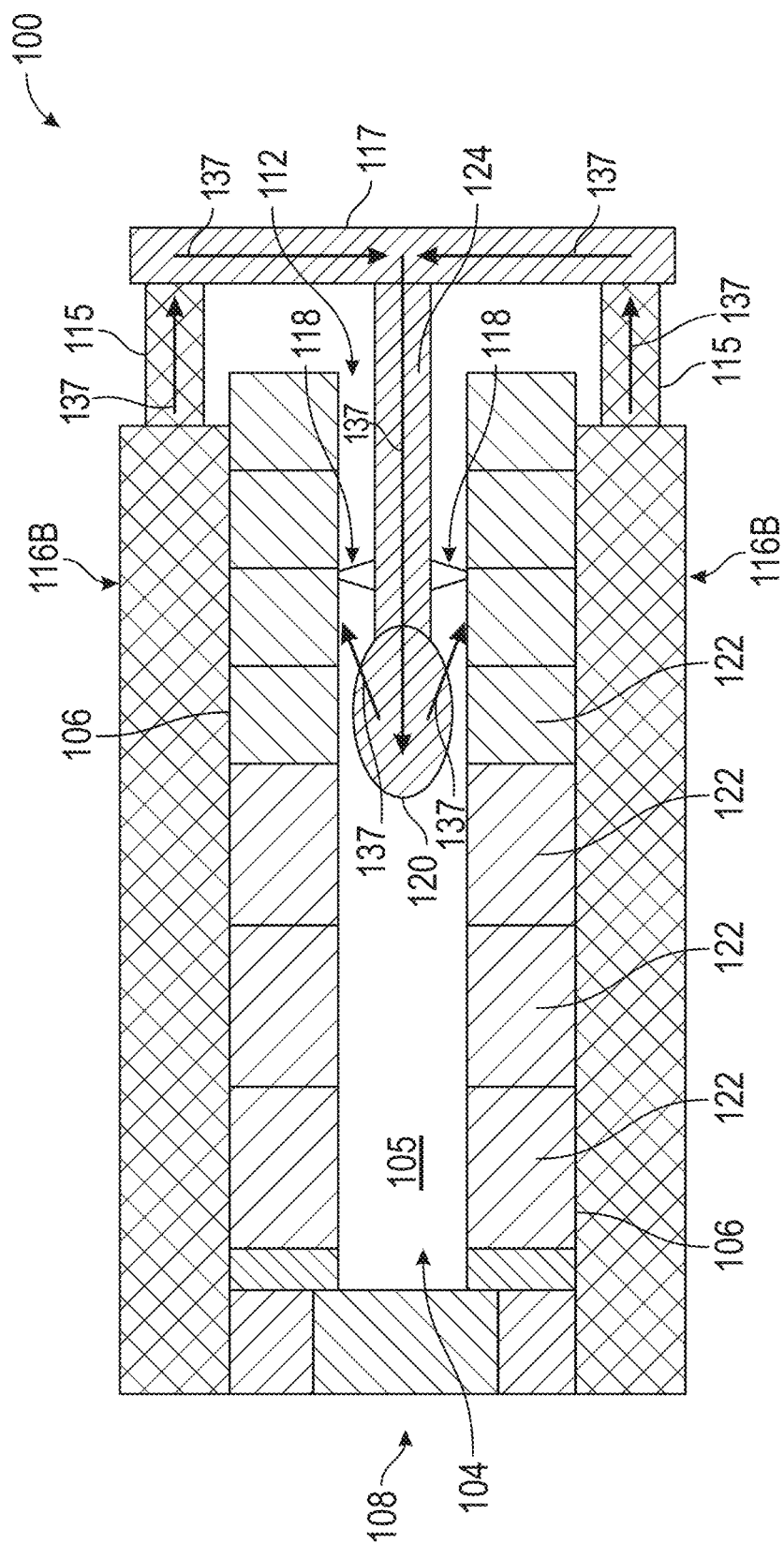
FIG. 2B is a cross-sectional view of an embodiment of a subscale system for testing the stability of rocket injectors having dual actuators in a first position.
Figure 2C:
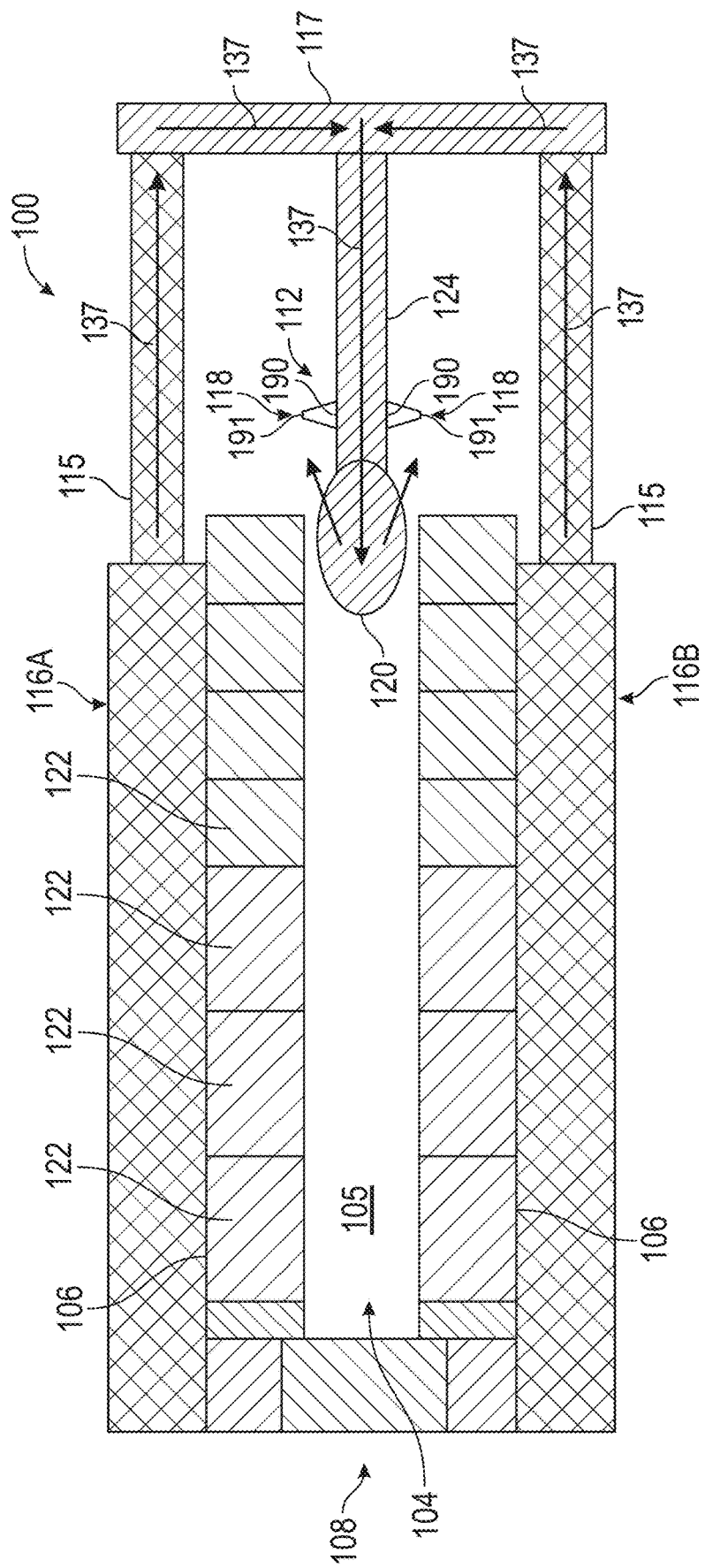
FIG. 2C is a cross-sectional view of the subscale system for testing the stability of rocket injectors of FIG. 2B with the dual actuators in a second position.
Figure 2D:
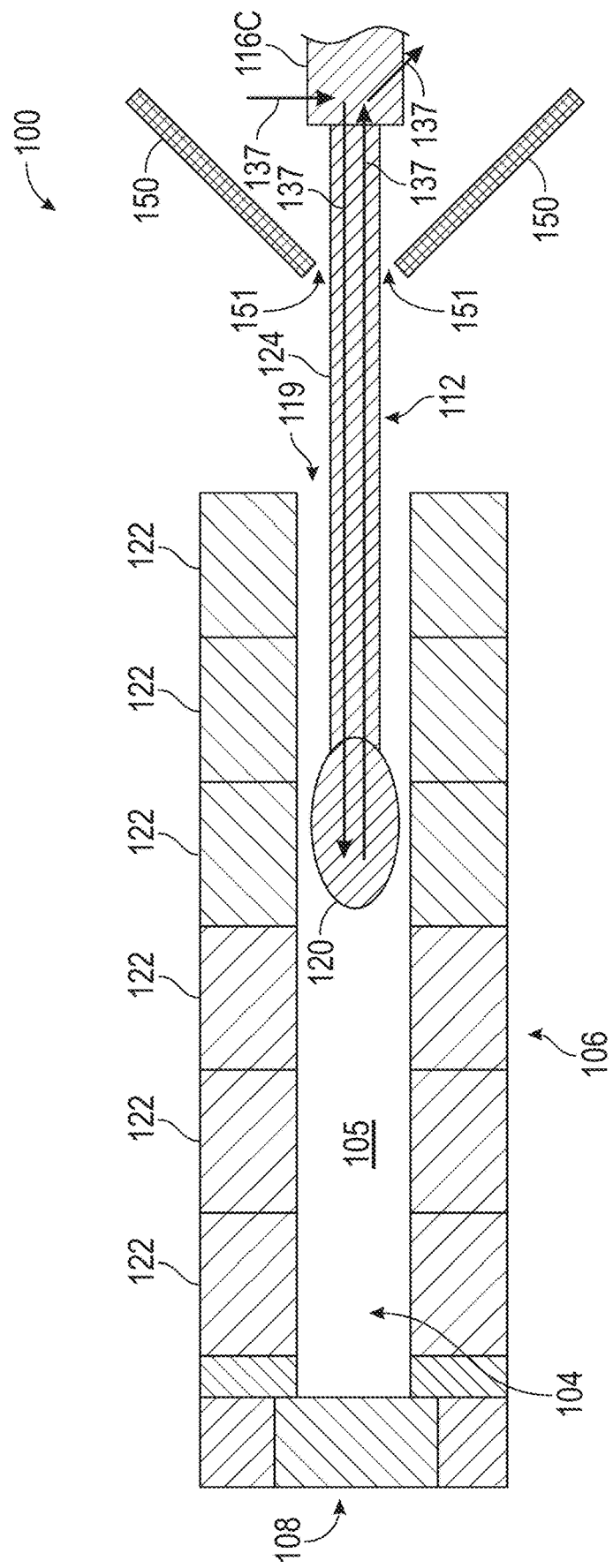
FIG. 2D is a cross-sectional view of an embodiment of a subscale system for testing the stability of rocket injectors having a deflector and an actuator positioned downstream of the combustion chamber behind the deflector.

FIGS. 2A-2D depict various embodiments of the system 100 having various actuators. As shown in FIG. 2A, in some embodiments, the system 100 may include an actuator 116A, which includes a single, external linear actuation mechanism. FIGS. 2B and 2C show the system 100 with an actuator 116B which includes dual external linear actuation components. FIG. 2D shows the system 100 with an actuator 116C positioned downstream and aligned with the combustion chamber 104. Some of the features of the actuators 116A, 116C are similar to the features of actuator 116 in FIGS. 1 and 4, except as otherwise described. Therefore, the structure and description for the various features of the actuator 116 and how it is operated and controlled in FIGS. 1 and 4 are understood to apply to the corresponding features of the actuator 116A in FIG. 2A and 116C in FIG. 2D, except as described below. Though the features below are described in connection with the actuator 116A, the features also relate as applicable to other actuators, such as actuators 116, 116B, 116C disclosed herein.

As shown in FIG. 2A, the actuator 116A may include a single linear actuation component positioned to one side of the system 100, such as below the combustion chamber 104. In some embodiments, the actuator 116A may be positioned adjacent an outer wall of the combustion chamber 104 and upstream of the exhaust exit opening. The positioning of the actuator 116A below or adjacent an outer wall of the combustion chamber 104 may be advantageous in that it protects the actuator 116A from exhaust exiting the system 100 at the exit 119. In some embodiments, the actuator 116A may be positioned a distance DI from an outside surface 106 of the combustion chamber 104. In some embodiments, the actuator 116A may be coupled to the outside surface 106 of the combustion chamber 104.

The actuator 116A may include an extension rod 115 that is configured to continuously move the piston 112 within the chamber 104. The extension rod 115 may be coupled directly to the extension rod 124 of the piston 112. The extension rod 115 may be coupled to a lateral portion 117 of the piston 112 that extends laterally or radially away from a central axis defined by the chamber 104. The lateral portion 117 may extend generally perpendicular to the extension rod 124 of the piston 112. In some embodiments, the lateral portion 117 and the extension rod 124 of the piston 112 may be a single integral or unitary part. During testing, the extension rod 115 of the actuator 116A may push and pull the lateral portion 117 of the piston 112 to continuously change the positioning of the piston 112 within the chamber 104. The movement of the piston 112 may continuously vary the volume of the region 105 of the combustion chamber 104 according to the present disclosure.

FIGS. 2B and 2C show an embodiment of the system 100 that includes dual actuators 116B. Some of the features of the actuators 116B may be similar to the features of actuator 116 in FIGS. 1 and 4 and the actuator 116A in FIG. 2A. Therefore, the structure and description for the various features of the actuators 116 and 116A and how they are operated and controlled in FIGS. 1 and 4, and FIG. 2A, respectively, are understood to apply to the corresponding features of the actuators 116B in FIGS. 2B and 2C, except as described herein. Though features may be described in connection with the actuators 116B, the features may also apply to other actuators, such as the actuators 116, 116A disclosed herein.

As shown in FIGS. 2B and 2C, the system 100 may include two actuators 116B (i.e., a dual actuator system). FIG. 2B illustrates the piston 112 in a first linearly contracted position, while FIG. 2B illustrates the piston 112 in a second linearly extended position that is different than the first. The dual actuator system may be advantageous in that the use of two actuators 116B provide additional structural stability and alignment control. One or both of the actuators 116B may include the same features as the actuator 116A described herein. The actuators 116B may be mounted to an outside surface 106 of the combustion chamber 104. A first actuator 116B may be positioned directly opposite, e.g. rotationally 180 degrees from, a second actuator 116B. One actuator 116B may be positioned on top of the combustion chamber 104 and the second actuator 116B may be positioned on the bottom of the combustion chamber 104. The actuators 116B may be positioned on opposite sides of the combustion chamber 104. The actuators 116B may be driven by a single motor. The use of a single motor may be advantageous in that it allows for the operation of the dual actuators 116B to be synchronized. In some embodiments two motors may be used. In some embodiments, one of the actuators 116B may actively move the piston 112 and the other of the actuators 116B may be passive and provide support to the linearly moving lateral portion 117.

The actuators 116B may each include the extension rod 115, as similarly described with reference to FIG. 2A above. The extension rods 115 may be coupled to or form a single integral or unitary part with the lateral portion or portions 117 of the piston 112. As shown in FIG. 2A, in some embodiments, cooling channels (e.g., cooling channels 130) may follow a path represented by the arrows and extend through the lateral portion 117 and to/through the piston 112 and the extension rod 124 of the piston 112. As shown in FIGS. 2B and 2C, in some embodiments, the cooling channels may follow a path represented by the arrows through the extension rod 115, lateral portion 117, the extension rod 124, and the head 120 of the piston 112. The cooling channels may extend from each end of the extending portion 117 and meet where the extension rod 124 extends from the lateral portion 117. The cooling channel may travel down the extension rod 124 to the head 120 of the piston 112. The cooling channel may have one or more exits that exit at the head 120 of the piston 112, as shown in FIGS. 2B and 2C. The cooling channel may have a return channel with one or more exits in other locations, such as at the top of the lateral portion 117, as shown in FIG. 2A. The coolant may exit into additional tubing attached thereto. The size of the actuators 116B may be determined, at least in part by, the size of the chamber 104, the size and/or path of cooling channels, and/or any instrumentation access that is required.

The cross-sectional area of the chamber downstream of the piston head 120 may be constant. In some embodiments, the cross-sectional area may vary. In some embodiments, there may be one or more fins 118 located downstream of the piston head 120, for example as shown in FIGS. 2B and 2C.

The one or more fins 118 may extend radially outward from the piston 112. The one or more fins 118 may be wider at a base portion 190 (as labeled in FIG. 2C) located near the piston 112 and narrower at a tip portion 191 (as labeled in FIG. 2C) located away from the piston 112. The one or more fins 118 may taper, e.g. decrease in width, in the outward radial direction. The one or more fins 118 may have an angled surface on an upstream facing side of the one or more fins 118 and/or the one or more fins 118 may have an angled surface on a downstream facing side of the one or more fins 118. There may be a single, continuous fin 118 extending circumferentially and continuously around the piston 112. In some embodiments, the one or more fins 118 may protrude radially outward from the piston 112 no more than 25%, no more than 50%, or no more than 75%, of the distance between the piston 112 and an opposing interior surface of the sidewall 128. The size of the one or more fins 118 may be application dependent. The one or more fins 118 may assist in maintaining the alignment of the piston head 120 within the combustion chamber 104, for example along a longitudinal axis of the combustion chamber 104 or along a parallel axis thereof. The one or more fins 118 may assist in providing stabilization for the extension rod 124 as the extension rod 124 translates within the combustion chamber 104. In some embodiments, the one or more fins 118 may be water cooled (e.g., comprise cooling channels). The one or more fins 118 may be a metallic material. In some embodiments, the one or more fins 118 may be a high temperature material. For example, the one or more fins 118 may be a carbon graphite.

FIG. 2D shows an embodiment of the system 100 that includes the actuator 116C positioned downstream of the combustion chamber 104. The actuator 116C may have the same or similar features as the actuator 116 in FIGS. 1 and 4, the actuator 116A in FIG. 2A, and/or the actuator 116B in FIGS. 2B and 2C, and vice versa. Therefore, the structure and description for the various features of the actuators 116, 116A, and 116B and how they are operated and controlled in FIGS. 1 and 4, FIG. 2A, and FIGS. 2B and 2C, respectively, may apply to the corresponding features of the actuator 116C in FIG. 2D, except as otherwise described herein.

As shown in FIG. 2D, the system may include the actuator 116C positioned downstream of the exit 119 of the combustion chamber 104. In some embodiments, the actuator 116C may be axially aligned with the exit 119 in a region of exhaust emitted from the combustion chamber 104. The actuator 116C may be protected by a deflector 150. The deflector may be a shield extending circumferentially about the extension rod 124. The deflector 150 may be positioned such that the exhaust exiting the combustion chamber 104 is deflected away from the actuator 116C. The deflector 150 may prevent or reduce the risk that exhaust exiting the combustion chamber 104 damages the actuator 116C. In some embodiments, an upstream facing side of the deflector 150 may be positioned at an angle. For example, the deflector 150 may extend outward and away from the extension rod 124. The angled positioning of the deflector 150 may control the direction in which the exhaust exiting the combustion chamber 104 is deflected. In some embodiments, the extension rod 124 extends through an opening 151 of the deflector 150. The opening 151 may extend through the thickness of the deflector 150. The opening 151 may be sized such that a gap between the deflector 150 and the extension rod 124 is minimized to reduce and/or prevent exhaust from reaching the actuator 116C. The opening 151 may be sized to allow the extension rod 124 to be translated through the deflector 150, while also preventing or reducing the amount of exhaust traveling therethrough. In some embodiments, the deflector 150 may include cooling channels configured to cool the deflector 150.

FIG. 4 is a perspective cross-sectional view of an embodiment of another system 101 for subscale testing of rocket engine injectors. The system 101 may be the same as the system 100 except for the piston 114. The piston 114 may have a head 131 and the extension rod 124. The head 131 may have a different shape and other features as compared to the head 120, as further described.

As shown in FIG. 4, the most upstream portion of the head 131 may be flat or planar. The head 131 may have a rounded, e.g., circular, diameter. The diameter of the head 131 may be smaller than the diameter of the combustion chamber 104. The diameter of the extension rod 124 may be smaller than the diameter of the head 120. The head 131 may have a thickness T in the axial direction. The thickness T may extend from the most upstream portion of the head 131 to the start of a transition to the extension rod 124. In some embodiments, the transition may be a gradual curve, with a varying diameter. In some embodiments, the transition may form a right angle, wherein a surface of the head 131 is perpendicular to the extension rod 124. The diameter of the head 131 may form the annular gap 126 between the outer diameter of the head 131 and the inner diameter of the combustion chamber 104.

The piston 114 may have the cooling channel 130. The cooling channel 130 may extend through the extension rod 124 and into an interior of the head 131. The cooling channel 130 can extend around a solid central portion 129 of the extension rod 124. The solid central portion 129 can extend from the head 131 through the extension rod 124. The cooling channel 130 may be configured to carry a coolant. The coolant may travel through the cooling channel 130 starting in the extension rod and to the head 131.

Figure 4A:
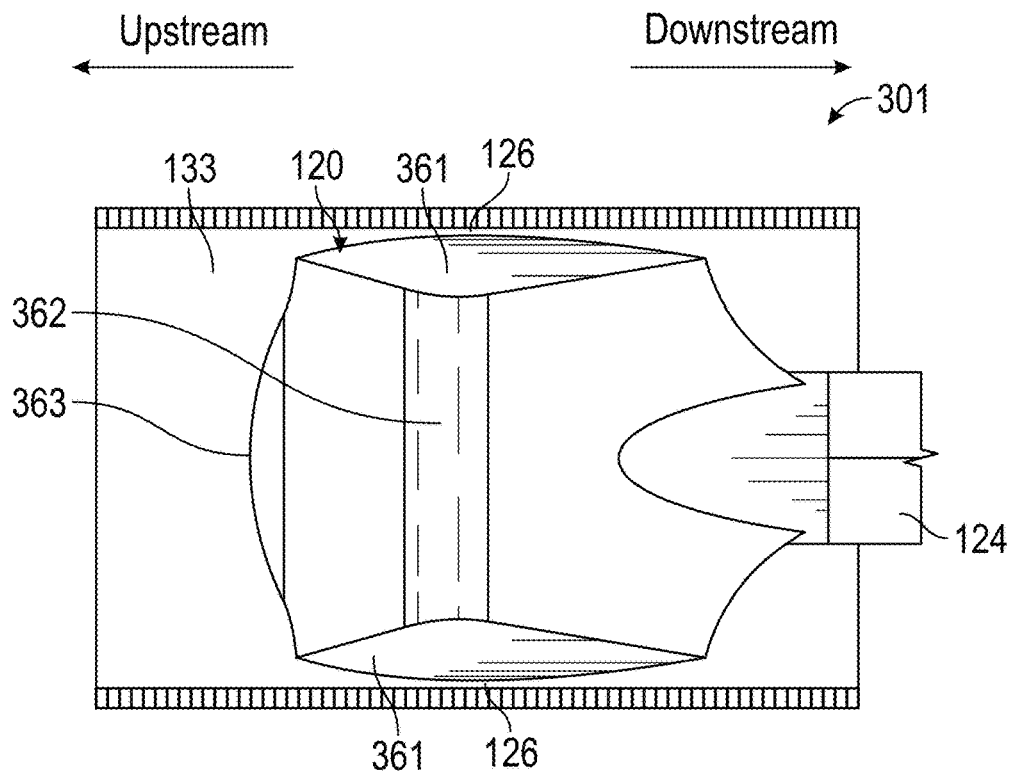
FIG. 4A is a side view of an axially moveable piston having an irregularly shaped upstream end.
Figure 4B:
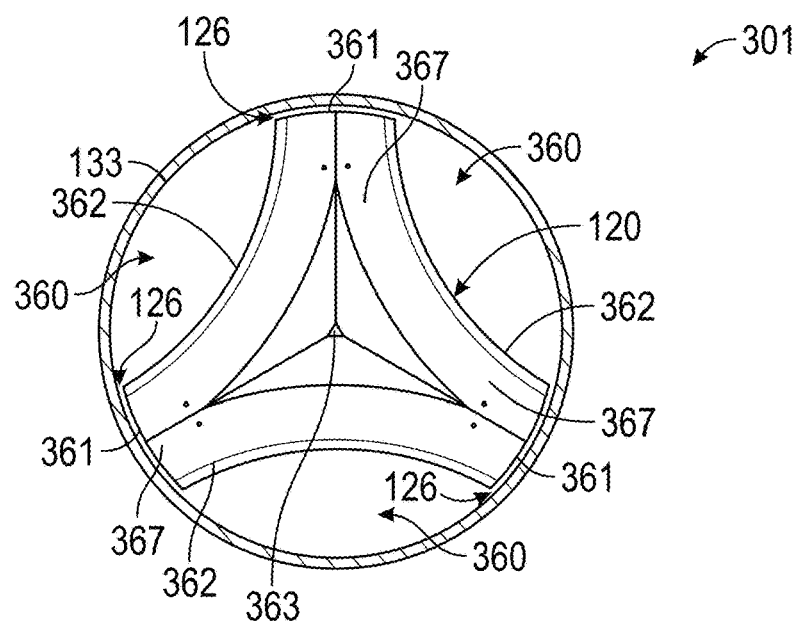
FIG. 4B is a front view of the axially moveable piston of FIG. 4A.

FIGS. 4A and 4B are side and front views respectively of an alternative embodiment of the piston (identified as a piston 301). Embodiments of the piston 301 may include any of the features discussed above or below with reference to other pistons (e.g., piston 112), and should not be limited to the particular embodiments discussed. For example, features of one embodiment may be combined with features of another embodiment. The particular modifications shown in FIGS. 4A and 4B will now be discussed in detail, and features not discussed will be understood to be similar, or identical, to those discussed above. Some or all of the modifications discussed below may be incorporated into the above disclosure.

The head 120 of the piston 301 may have a triangular shape. The head 120 of the piston 301 and an inner wall 133 of the combustion chamber 104 may define one or more open areas or channels 360. The open areas or channels 130 can define flow paths for the combustion exhaust. The head 120 may include a plurality of radially extending segments 367, for example three segments 367. The segments 367 may have outer circumferential walls 361, which may be configured to contact the inner wall 133 of the combustion chamber 104. Exhaust may be prevented from flowing around the exterior of the piston 301 at the interfaces of the walls 361 and the inner wall 133 of the chamber 104. All exhaust may flow through the channels 360. The plurality of walls 361 may have a curvature that corresponds to the curvature of the inner wall 133 of the combustion chamber 104. The plurality of walls 361 may be circumferentially spaced around the head 120 of the piston 301. The segments 367 may include radially outward facing inner walls 362.

Each adjacent wall of the plurality of walls 361 may be connected by the curved wall 362. The curved walls 362 may define a portion of one of the open areas 360. The plurality of walls 361 and the curved walls 362 may all taper to a blunt end 363 at the upstream most end of the head 120 of the piston 301 and taper toward the extension rod 124 at the end opposite the upstream end, for example as shown in FIG. 4A.

Figure 4C:
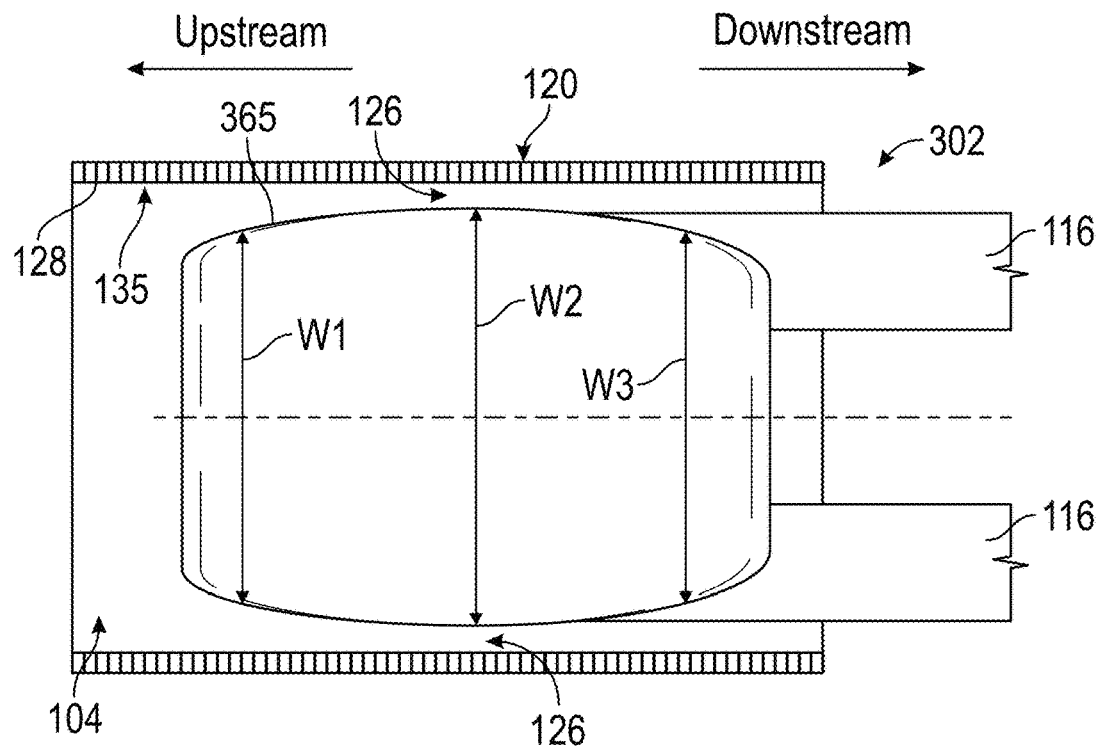
FIG. 4C is a side view of an axially moveable piston having a donut shaped upstream end.
Figure 4D:
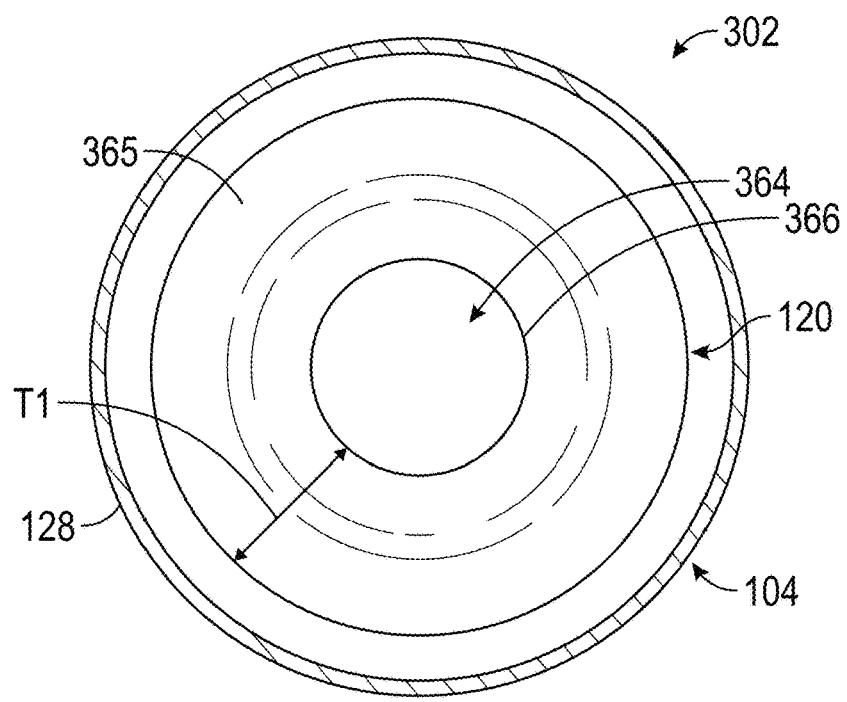
FIG. 4D is a front view of the axially moveable piston of FIG. 4C.

FIG. 4C is a side view of an alternative embodiment of the piston (identified as a piston 302) and FIG. 4D is a front view. Embodiments of the piston 302 may include any of the features discussed above or below with reference to other pistons (e.g., piston 112, piston 301), and should not be limited to the particular embodiments discussed. For example, features of one embodiment may be combined with features of another embodiment. The particular modifications shown in FIGS. 4C and 4D will now be discussed in detail, and features not discussed will be understood to be similar, or identical, to those discussed above. Some or all of the modifications discussed below may be incorporated into the above disclosure.

The head 120 of the piston 302 may have a donut shape cross-section that is elongated axially. The head 120 of the piston 302 may include a circumferential wall 365 that defines an internal channel 364 that extends through the interior of the head 120 of the piston 302 in the same general direction that the combustion chamber 104 extends, e.g. axially. The wall 365 may form a generally cylindrical shape. The wall 365 may have a thickness T1 that increases from a first upstream end of the head 120 of the piston 302 to a generally central location along the length of the head 120 of the piston 302 and then decreases toward a second opposite, downstream end of the head 120 of the piston 302. An upstream, transverse width W1 of the head 120 at or near the upstream end of the head 120 may be smaller than a central width W2 of the head 120 located at or near the central region of the head 120, which may be larger than a downstream width W3 of the head 120 at or near the downstream end of the head 120. In some embodiments, the transverse width of the head 120 may continuously increase in the downstream direction from the first upstream end of the head 120 to the generally central location of the head 120 (for example, from W1 to W2) and then continuously decrease toward the downstream second end of the head 120 (for example, from W2 to W3).

The head 120 of the piston 302 may have an outer diameter that is less than the inner diameter of the combustion chamber 104. There may be an annular gap 126 defined between the wall 365 of the head 120 and the inner surface 135 of the wall 128 of the chamber 104. A radial dimension of the annular gap 126 may be a minimum at the central location of the head 120, for example at the width W2. In some embodiments, the wall 365 of the head 120 may contact the inner surface 135 of the wall 128 of the chamber 104 to prevent exhaust from flowing around the exterior of the head 120. Some or all exhaust may flow through an interior channel 364 defined by the head 120. The interior channel 364 may be an opening extending through the head 120. The piston 302 may be coupled to one or more actuators 116. The one or more actuators 116 may be coupled to the wall 365.

The interior channel 364 of the head 120 may have a variable width in the axial direction. The interior channel 364 may provide a chokepoint within the head 120 at a throat 366. The throat 366 may be a portion of the interior channel 364 within the head 120 that has a minimal cross-sectional area. The throat 366 may be axially located at a central location of the head 120. The throat 366 may be axially located upstream or downstream of a central location of the head 120.

Figure 5A:
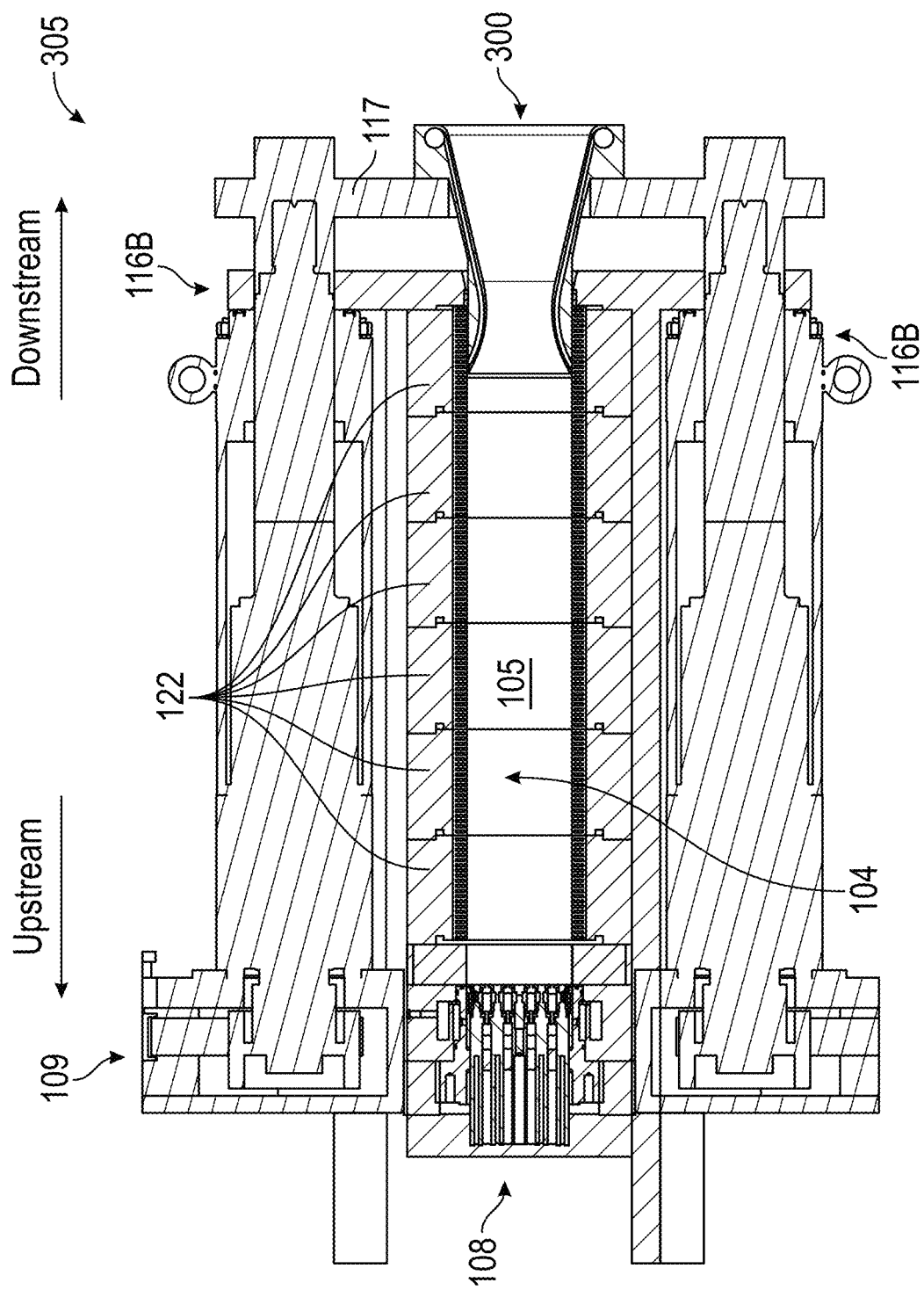
FIG. 5A is a cross-sectional view of another embodiment of a subscale system for testing the stability of rocket injectors having an internal telescoping throat.
Figure 5B:
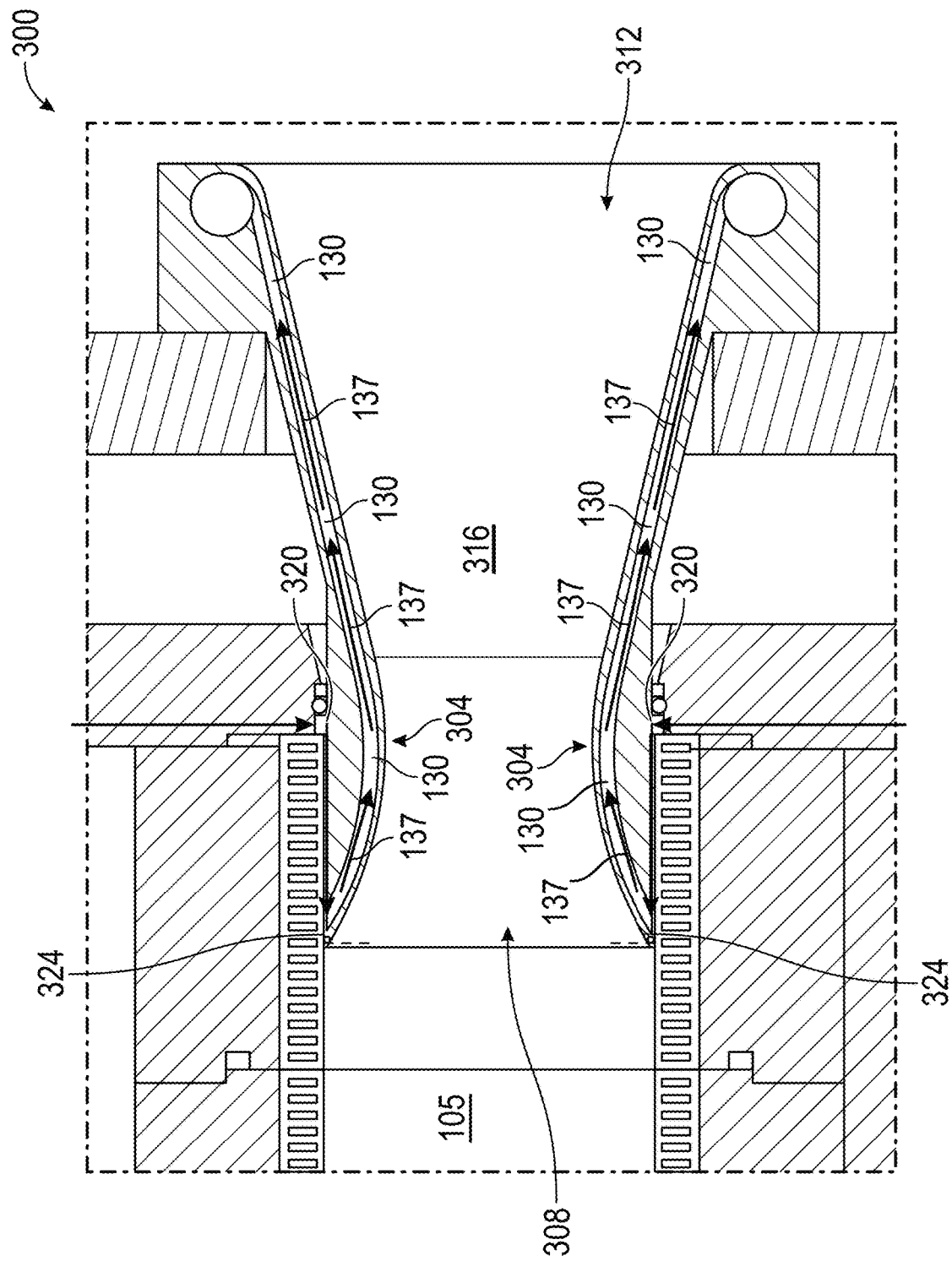
FIG. 5B is a cross-sectional view of the subscale system of FIG. 5A illustrating an example embodiment of cooling channels within the telescoping throat.

FIGS. 5A and 5B are cross-sectional views of an alternative embodiment of a subscale system 305 for testing the stability of rocket injectors that have internally telescoping features. Embodiments of the system 305 may include any of the features of the testing systems discussed above or below, and should not be limited to the particular embodiments described. For example, features of one embodiment may be combined with features of another embodiment. The particular modifications shown in FIGS. 5A and 5B will now be discussed in detail, and features not discussed will be understood to be similar, or identical, to those discussed elsewhere herein. Some or all of the modifications discussed with respect to FIGS. 5A and 5B may be incorporated into the other embodiments described herein.

The system 305 may have an internal telescoping throat 300. The telescoping throat 300 may function and be translated similarly to the piston 112 described herein. While the telescoping throat 300 is coupled to the system 305 via dual actuators 116B, any of the actuators described herein may be used. The telescoping throat 300 may have an outer diameter at an upstream end that is sized to fit within the inner diameter of the combustion chamber 104. The outer diameter of the telescoping throat 300 may be sized to slide within the combustion chamber 104 when the telescoping throat 300 is moved by the actuators 116B. The movement of the telescoping throat 300 within the combustion chamber 104 may continuously vary the volume of the region 105 of the combustion chamber 104.

FIG. 5B is a closeup cross-sectional sideview of the telescoping throat 300 of the system 305. The telescoping throat 300 may have a sidewall 304 that extends annularly around, and defines an inner surface, of the telescoping throat 300. The sidewall 304 may define an inner width, e.g. inner diameter, of the telescoping throat 300 that decreases from an upstream end 308 of the telescoping throat 300 in the downstream direction to a minimum, and then increases in the downstream direction towards a downstream end 312 of the telescoping throat 300. The sidewall 304 may shape an inner area 316 of the telescoping throat 300 such that it mimics the appearance of a converging-diverging nozzle.

In some embodiments, the telescoping throat 300 may include cooling channels 130. The paths of coolant flowing through the cooling channels 130 are illustrated by the arrows in FIG. 5B that extend through the cooling channels 130. Coolant may enter the cooling channels 130 through one or more openings 320. The coolant may then travel toward the upstream end 308 of the telescoping throat 300 through a portion of the cooling channel 130 that is defined between the inner diameter of the combustion chamber 104 and the outer diameter of the telescoping throat 300, where it may reach a coolant seal 324. The coolant seal 324 may prevent or limit any coolant from flowing into the combustion chamber 104. The coolant may then travel through the sidewall 304 and further toward the downstream end 312 of the telescoping throat 300.

The telescoping throat 300 may be advantageous in that it may provide lateral stability. The telescoping throat 300 may eliminate or reduce the risk of lateral movement which may result with a cantilevered piston. The telescoping throat 300 may also simplify chamber construction by allowing for a constant area exhaust length. The telescoping throat 300 also reduces the required actuator length, and may allow for all calorimeter bodies (e.g., calorimeter bodies 123, shown in FIG. 1B) to be sized for chamber heat flux.

Figure 5C:
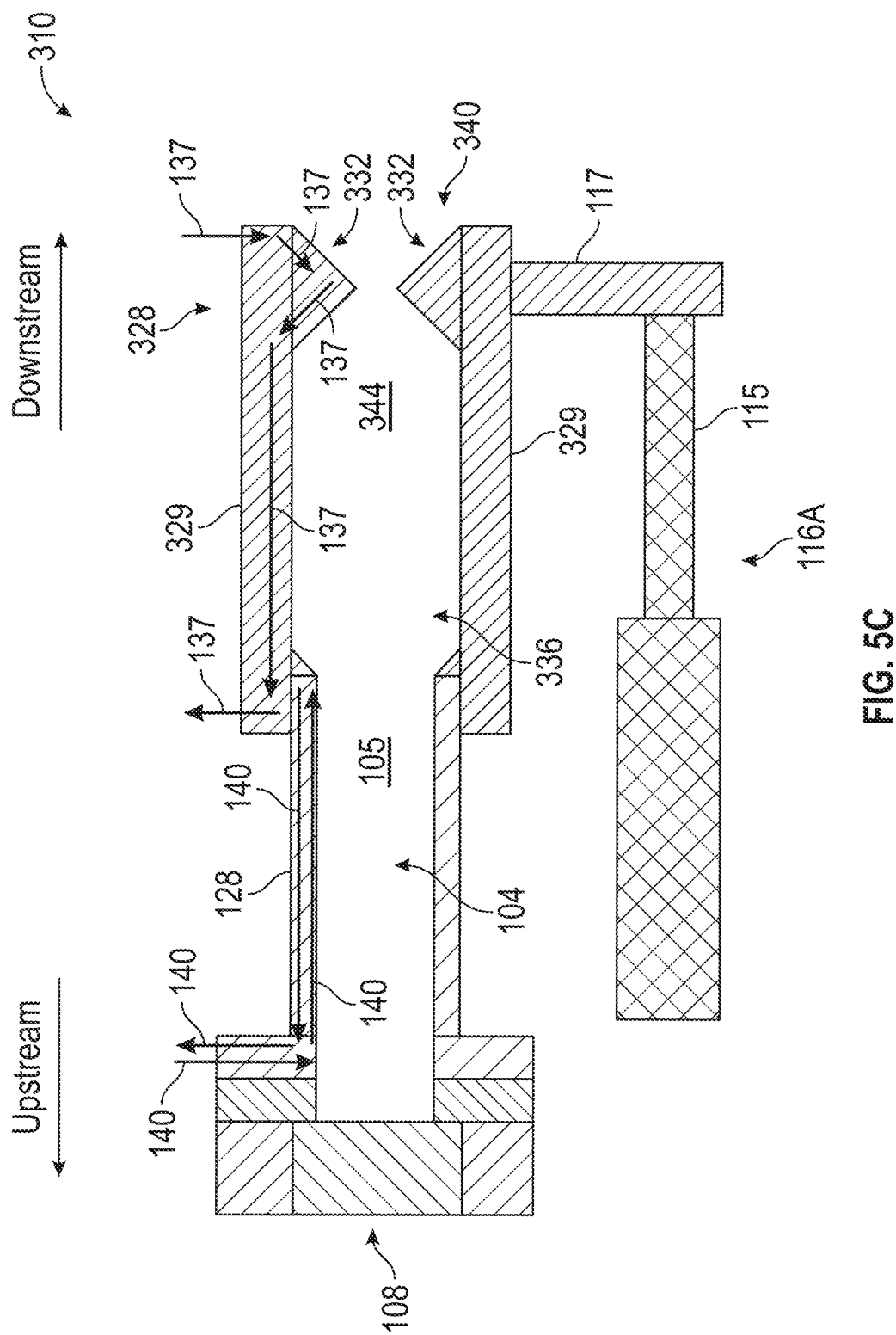
FIG. 5C is a cross-sectional schematic view of another embodiment of a subscale system for testing the stability of rocket injectors having an external telescoping throat.

FIG. 5C is a cross-sectional schematic view of an alternative embodiment of a subscale system 310 for testing the stability of rocket injectors having an external telescoping throat 328. Embodiments of the system 310 may include any of the features of other testing systems discussed herein, and should not be limited to the particular embodiments described. For example, features of one embodiment may be combined with features of another embodiment. The particular modifications shown in FIG. 5C will now be discussed in detail, and features not discussed will be understood to be similar, or identical, to those discussed herein. Some or all of the modifications discussed with respect to FIG. 5C may be incorporated into other embodiments described herein.

The system 310 may have the external telescoping throat 328 configured to translate linearly in axial directions. The telescoping throat 328 may function and be translated similarly to the piston 112 described herein. One or more of the actuators 116A may linearly translate the extension rod 115 and transfer linear motion to the telescoping throat 328 via the lateral portion 117. While the telescoping throat 328 is coupled to the system 310 via the single actuator 116A, any of the actuators described herein may be used. The telescoping throat 328 may have an axially-extending, cylindrical sidewall 329 that defines an inner diameter that is sized to fit around an outer diameter of the correspondingly cylindrical combustion chamber 104. The sidewall 329 of the telescoping throat 328 may be moved along the outer diameter of a fixed, annular wall 128 of the combustion chamber 104 by the actuator 116A. The movement of the telescoping throat 328 along the wall 128 of the combustion chamber 104 may continuously vary the volume of the inner region 105 of the combustion chamber 104.

The telescoping throat 328 may have an inner protrusion 332 that extends annularly around an inner surface of the telescoping throat 328. The inner protrusion 332 may have a height, measured radially-inwardly, that gradually increases from a location closer to an upstream end 336 of the telescoping throat 328 to a maximum height, and then decreases in height from the maximum height towards a downstream end 340 of the telescoping throat 328. The inner diameter of the telescoping throat 328 may be a minimum where the radially-inward height of the inner protrusion 332 is at its maximum. The inner protrusion 332 may shape an inner area 344 of the telescoping throat 328 such that it mimics the appearance of a nozzle. The inner protrusion 332 is shown schematically, and may have a smooth inner surface that mimics the shape of a converging-diverging nozzle, such as the shape of the inner area 316 shown in FIG. 5B.

The system 310 may include one or more cooling channels that flow coolant along paths denoted by the arrows 137, 140 as shown. The telescoping throat 328 may include a cooling channel that flows coolant along the arrows 137 in a path that extends from the downstream end 340 of the telescoping throat 328 to the upstream end 336 of the telescoping throat 328. The coolant in the telescoping throat 328 may travel along the arrows 137 through the inner protrusion 332. The coolant in the combustion chamber 104 may flow through a cooling channel along the arrows 140 through a wall 128 of the combustion chamber 104. The coolant may flow along the entire length of the combustion chamber 104. The coolant may flow along a partial length of the combustion chamber 104. In some embodiments, coolant may flow along a first portion extending in a first direction along the length of the combustion chamber 104 and along a second portion extending in a second direction opposite the first direction along the length of the combustion chamber 104. Coolant may exit the system 310 from the sidewall 329 or the wall 128 as shown. The coolant exiting the system may flow into additional tubes or other components external to the system 310. The cooling channel flowing through the wall 128 of the combustion chamber 104 may be physically separate from the cooling channel that flows coolant in the telescoping throat 328.

Figure 5D:
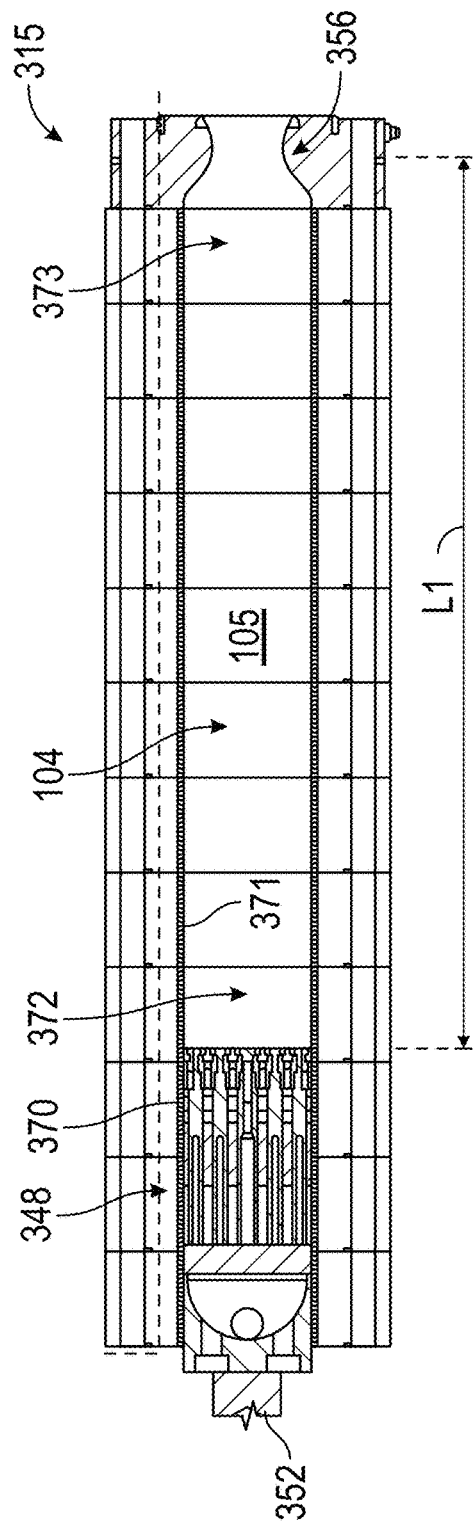
FIGS. 5D and 5E are cross-sectional views of another embodiment of a subscale system for testing the stability of rocket injectors having a telescoping injector plate.
Figure 5E:
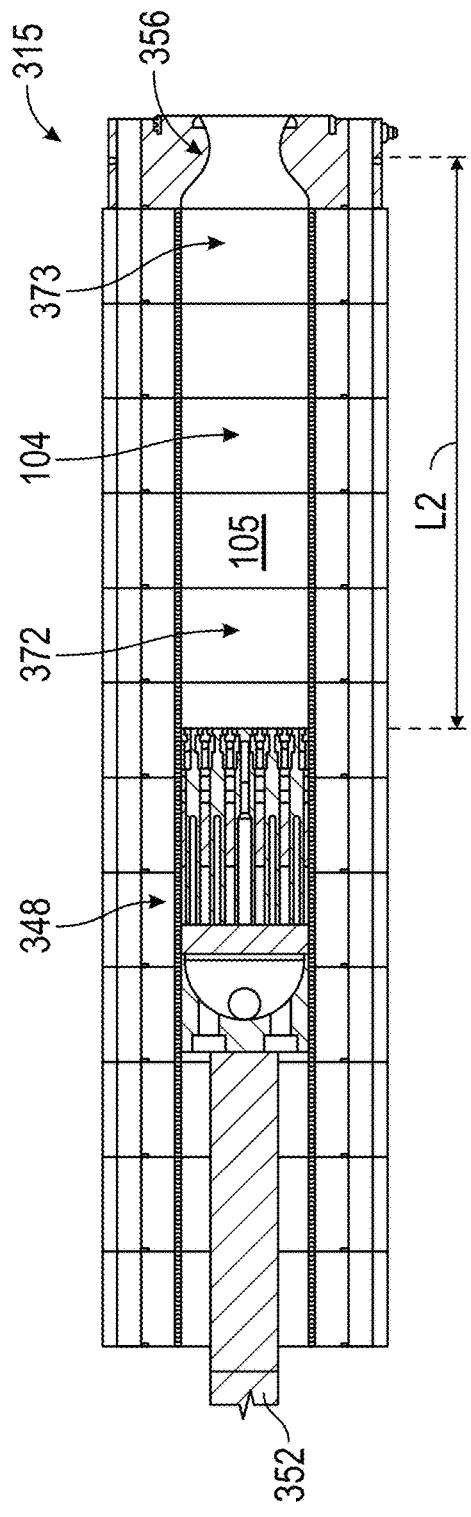

FIGS. 5D and 5E are cross-sectional views of another embodiment of a subscale system 315 for testing the stability of rocket injectors having a telescoping injector plate 348. Embodiments of the system 315 may include any of the features discussed herein, and should not be limited to the particular embodiments discussed. For example, features of one embodiment may be combined with features of another embodiment. The particular modifications shown in FIGS. 5D and 5E will now be discussed in detail, and features not discussed will be understood to be similar, or identical, to those discussed elsewhere herein. Some or all of the modifications discussed with respect to FIGS. 5D and 5E may be incorporated into other embodiments described herein.

The system 315 may have the telescoping injector plate 348 configured to translate linearly within the chamber 104. The telescoping injector plate 348 may include any of the features of the injector plate 108, for example as described with respect to FIGS. 1A and 1B. The telescoping injector plate 348 may be sized to fit within the combustion chamber 104. For example, an outer wall 370 of the telescoping injector plate 348 may have an outer diameter that is smaller than an inner diameter of the sidewall 371 of the combustion chamber 104. The telescoping injector plate 348 may be removably positioned within an upstream end 372 of the combustion chamber 104. The location of the upstream end 372 may change as the injector plate 348 translates.

The telescoping injector plate 348 may be coupled to an actuator 352. The actuator 352 may be configured to linearly translate the telescoping injector plate 348 through the combustion chamber 104 during use. The movement of the telescoping injector plate 348 may continuously vary the volume of the combustion region 105 of the combustion chamber 104. For example, FIG. 5D illustrates the telescoping injector plate 348 in a first upstream position, where a length L1 is defined from a downstream end of the injector plate 348 to a throat 356, and which defines a larger volume of the region 105 as compared to that of FIG. 5E, which shows the telescoping injector plate 348 in a second downstream position relative to the first position and where a length L2 extending from the downstream end of the injector plate 348 to the throat 356 is less than L1. In some embodiments, L1 may be from about 10 inches to about 50 inches, from about 20 inches to about 40 inches, from about 25 inches to about 35 inches, about 30 inches, or 28 inches. In some embodiments, L2 may be from about 5 inches to about 25 inches, from about 10 inches to about 30 inches, from about 15 inches to about 25 inches, about 20 inches, or 18 inches.

The system 315 may include the throat 356. The throat 356 may be fixed at the end of the downstream end 373 of the combustion chamber 104 opposite the telescoping injector plate 348. The throat 356 may not move linearly or laterally with respect to the combustion chamber 104. The throat 356 may remain stationary while the telescoping injector plate 348 is translated, thereby varying the volume of the combustion region 105. The throat 356 may provide a converging-diverging cross-sectional area. The throat 356 may have an inner diameter that continuously decreases in a downstream direction from a first upstream inner diameter to a second smaller and minimum inner diameter, and then continuously increases in the downstream direction from the second inner diameter to a third larger inner diameter at the exit. The second diameter may thus be less than both the first and third diameters. The inner contour of the throat 356 may mimic that of a nozzle shape as described in various embodiments herein.

The use of the telescoping injector plate 348 may be advantageous in that any variables due to translating the throat are removed as the throat remains fixed, all calorimeters (e.g., calorimeter bodies 123) are sized for chamber heat flux, and the actuator is naturally positioned away from the exhaust.

Continuously varying the volume of the region 105 of the combustion chamber 104 according to the embodiments of the present disclosure may provide many benefits and advantages. These include the ability to support a system having a traverse length of over 10 inches, the ability to maintain a consistent throat area during operation by maintaining the static and dynamic alignment to the chamber as well as having fixed throat dimensions, and providing a well-defined acoustic boundary.

Figure 6:
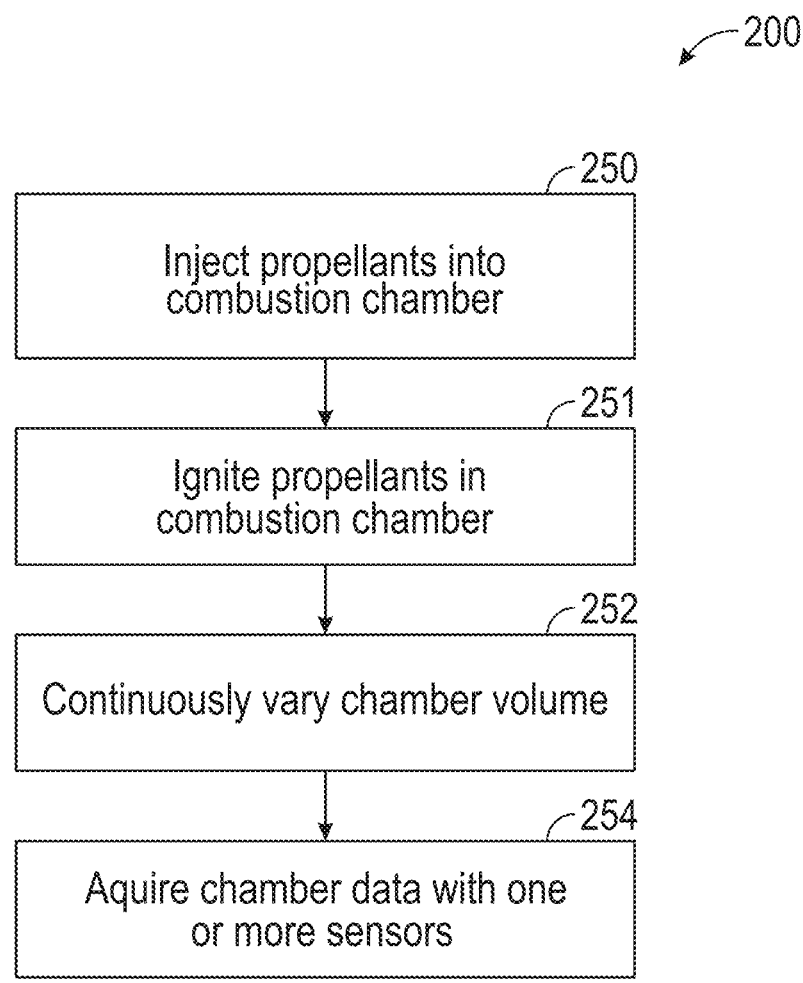
FIG. 6 is a flow chart showing an embodiment of a method for subscale testing of rocket injector stability.

FIG. 6 is a flow chart showing an embodiment of a method 200 of subscale testing of rocket injector stability. The method 200 may be performed by the systems 100, 101, 305, 310, 315, or variations thereof.

The method 200 begins with step 250 where propellants, such as a fuel and an oxidizer, may be injected into a combustion chamber (e.g., combustion chamber 104). The propellants may be continuously injected into the combustion chamber. The fuel and oxidizer may be injected into the chamber by one or more injector elements (e.g., injector elements 110).

The method 200 may then move to step 251 wherein the propellants may be ignited within the combustion chamber. The fuel and oxidizer may combust within the combustion chamber. In some embodiments, the ignition of the propellants may optionally be performed during the injection step (e.g., step 250). The modular injector plate 108 may support the injector elements 110, and be replaced with different injector elements, etc. as described herein, after completing the method 200 for subsequent testing. The plate 108 may be attached to the system, for example to the manifold 109. A piston or injector plate may be in a first location within the combustion chamber during step 250.

The method 200 then moves to step 252 where the combustion chamber volume is continuously varied by axial movement of a moveable component such as the piston (e.g., piston 112), the throat (e.g. throat 300 or 328), or the injector plate (e.g. injector plate 328). In some embodiments, the combustion chamber volume may be continuously varied by continuously varying the length of the combustion chamber and/or the region 105 of combustion. The component may be moved from its first location during combustion of the injected fuel in step 250. As described herein, the movement of the component may continuously vary the volume of the combustion region within the chamber. Thus different acoustic modes may be produced in step 252 due to movement of the component. The component may be smoothly moved from a first axial location to a second downstream axial location, or vice versa. The component may be in multiple locations between the first and second locations during combustion.

In some embodiments, step 252 may further include flowing a coolant through a cooling channel (e.g., cooling channel 130) within the component. As described herein, the coolant can flow through a piston and exit through a gap between the shell (e.g., shell 132) and the head 120 of the piston 112. In other embodiments, coolant may flow through the various throats or combustion chambers, as described herein. The method 200 may also include replacing the injector plate (e.g., injector plate 108) with a different injector plate after completion of the method 200 for subsequent testing. The method 200 may also include flowing exhaust from the combustion volume through an annular gap or flow path (e.g., annular flow path 126) of the chamber. The combustion products may flow through various paths depending on the particular system utilized. For example, the combustion products may flow through the upstream, constant cross-sectional area portion of the chamber, into a decreasing cross-sectional area portion about an upstream portion of the piston, and then into an increasing cross-sectional area portion about a downstream portion of the piston, and then exit the chamber.

The method then moves to step 254 where data may be acquired and/or detected. In some embodiments, the data acquired and/or detected may be acoustic data. For example, pressure data from within the combustion chamber may be detected as the component (piston, throat, or injector plate) is moved. One or more sensors (e.g., the sensors 113) may be configured to detect the data at one or more annular and/or axial locations within the chamber. In some embodiments, the data may be analyzed to assess the stability of the one or more injector elements. Various resonant frequencies may be identified as the component moves to characterize the injectors. Pressure may be detected over time. Changes in the pressure may be detected and analyzed. Acoustic modes may be identified based thereon to assess stability.

Figure 7A:
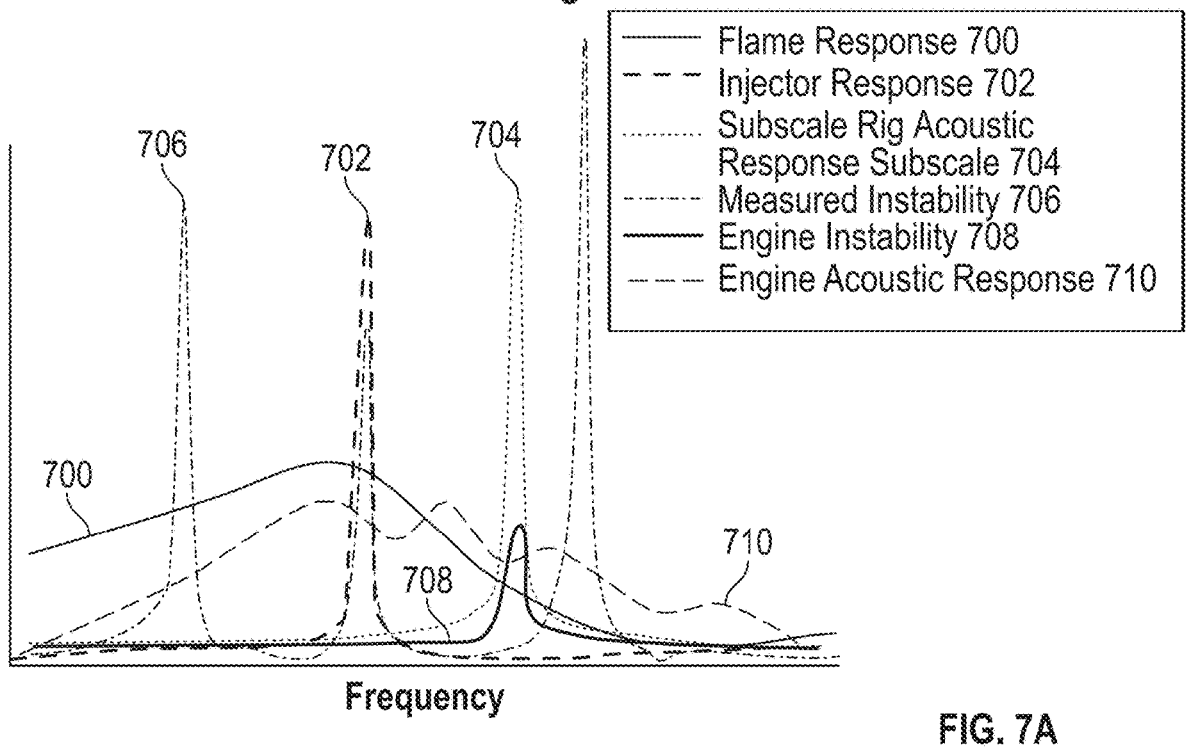
FIG. 7A is a data chart showing expected acoustic frequency data using a static subscale testing system.
Figure 7B:
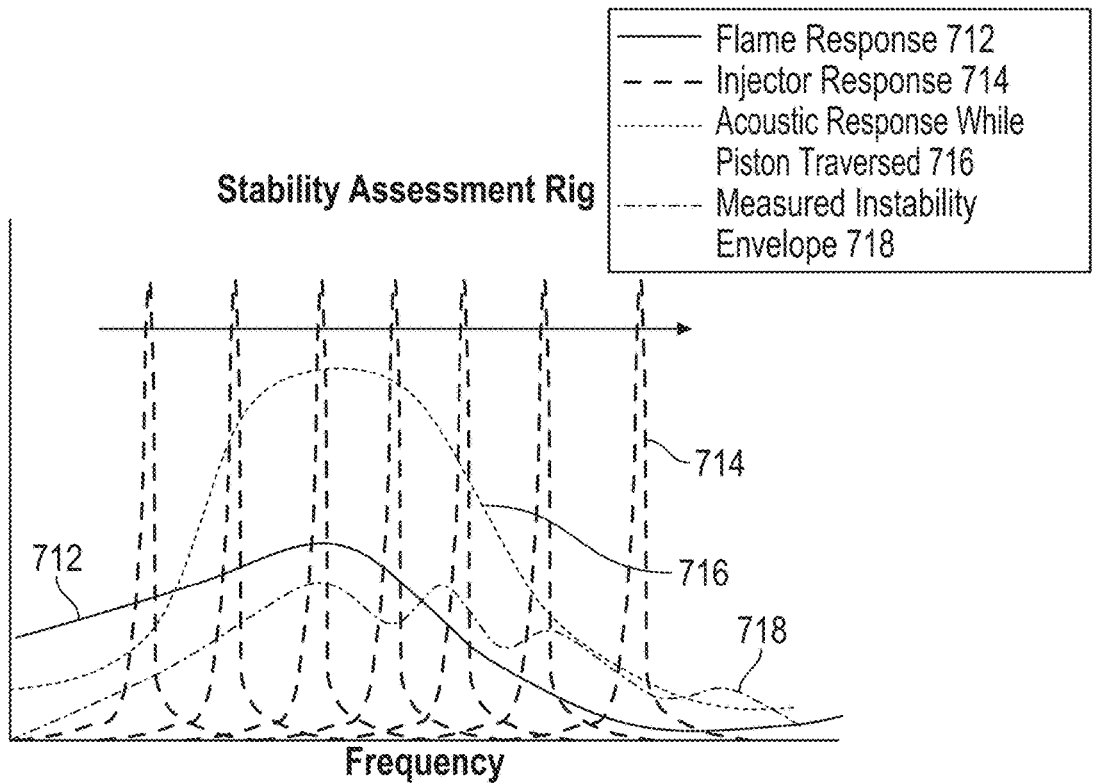
FIG. 7B is a data chart showing expected acoustic frequency data using a subscale testing system with a continuously variable combustion volume according to the present disclosure.

FIGS. 7A and 7B are analytical data plots of instabilities and injector responses. Combustion chamber environments may create high levels of acoustic noise. The power spectrum of the acoustic pressure levels may show an oscillation, i.e., combustion instability, where sound pressure peaks with well-defined magnitudes are summed with the background noise. These peaks are correlated with the resonance frequencies of the combustion chamber, where the acoustic natural frequencies and the burning oscillations of the combustion chamber are coupled, which can cause the instabilities and consequent unexpected behavior such as efficiency loss or even explosion of the engine.

FIG. 7A is a data chart showing expected acoustic mode data across various frequencies from a conventional "static" subscale testing system without a variable combustion chamber volume. Discrete peaks are shown for the subscale and full scale acoustic responses and instabilities. As shown, the sub-scale measured instability and acoustic response are at frequencies that are far different from the actual full scale engine instability and acoustic response. The static test system thus does not accurately predict the injector stability at full scale.

In contrast, FIG. 7B is a data chart showing expected acoustic mode data using a subscale testing system according to the present disclosure with a continuously variable combustion volume (e.g., systems 100 or 101 or other embodiments described herein). FIG. 7B is representative of when the flame/injector response is coupled with acoustic modes across a range of frequencies as the downstream boundary is translated, spanning all of those anticipated at full-scale, for example, by moving a piston (e.g., piston 112) within a combustion chamber (e.g., combustion chamber 104), as described herein. The results as shown in FIG. 7B allows injectors (e.g., injector plate 108) to be screened for stability issues in a consistent and efficient way well before full scale testing commences. As shown, the full scale measured instability envelope and acoustic modes can be accurately predicted based on the subscale testing results.

Figure 7C:
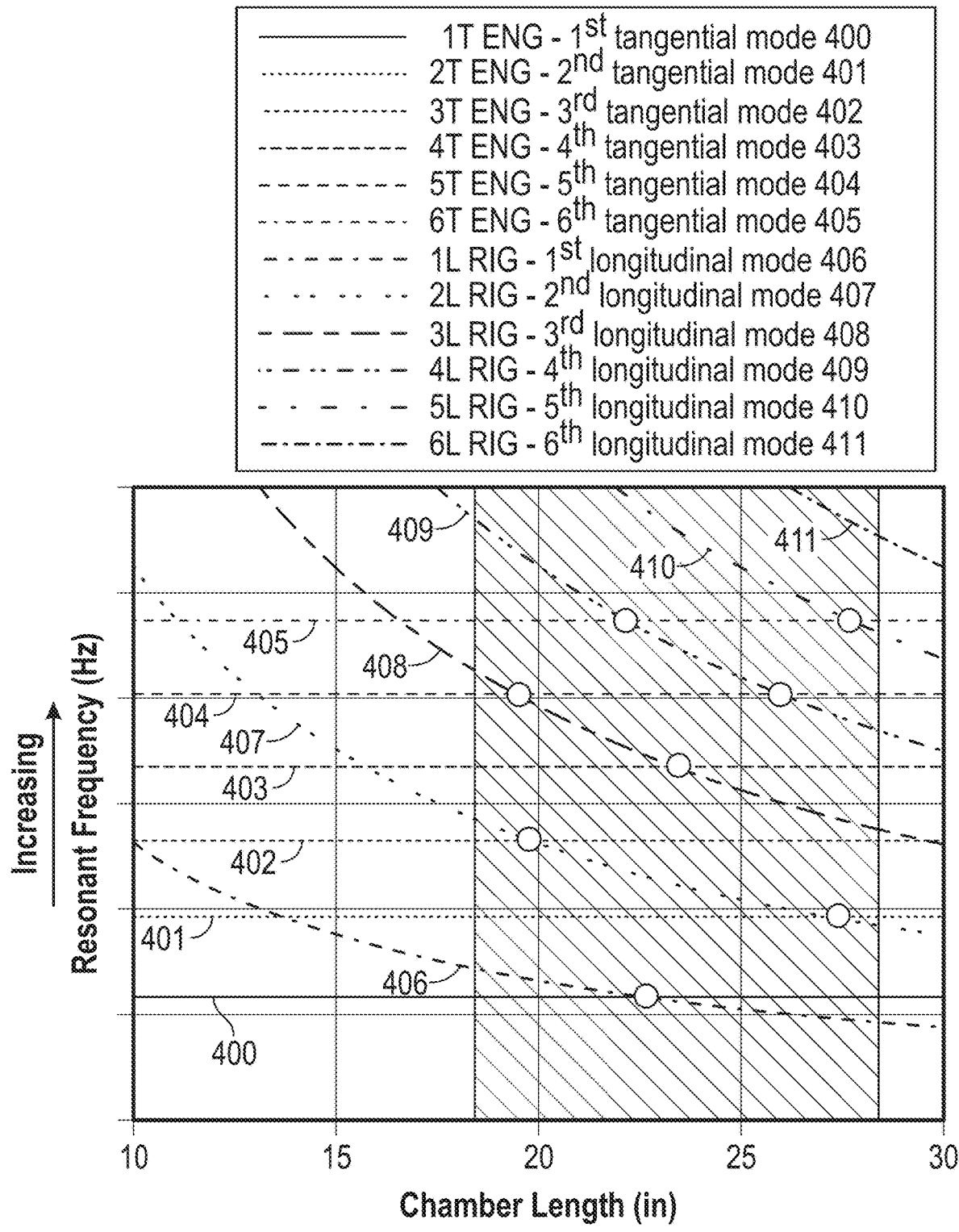
FIG. 7C is a data chart showing example expected resonant frequency depending on combustion chamber length using a subscale testing system with a continuously variable combustion volume according to the present disclosure.

FIG. 7C is a data chart showing expected resonant frequency depending on combustion chamber length using a subscale testing system with a continuously variable combustion volume according to the present disclosure. The data chart of FIG. 7C illustrates expected data in connection with the embodiment of the testing system 100 illustrated in FIG. 1B. As shown in FIG. 7C, it is expected that as the combustion chamber (e.g., combustion chamber 104) increases in length, the resonant frequency will gradually decrease along a curve. The data chart of FIG. 7C illustrates various tangential modes for an example rocket engine and various longitudinal modes for an example subscale test system. In particular, the chart shows a first tangential mode 400, a second tangential mode 401, a third tangential mode 402, a fourth tangential mode 403, a fifth tangential mode 404, and a sixth tangential mode 405 for the engine, and a first longitudinal mode 406, a second longitudinal mode 407, a third longitudinal mode 408, a fourth longitudinal mode 409, a fifth longitudinal mode 410, and a sixth longitudinal mode 411 for the test system. The tangential mode may refer to the frequency of waves formed between two or more surfaces. The longitudinal mode may refer to the frequency of a particular standing wave pattern formed by waves in a confined area (e.g., the combustion chamber 104).

In addition to the benefits and advantages described herein, the system 100 may provide additional insight into injector response functions that is not available during full scale testing. For example, the controlled and variable boundary condition (variable chamber size) provides for more data. The system may also provide additional data on stability aids, such as the interchangeable cavity ring 111. Further, the system 100 may allow for a quick response to stability issues that are identified during full scale testing as they could be quickly reproduced and tested using the system 100.

Various modifications to the implementations described in this disclosure will be readily apparent to those skilled in the art, and the generic principles defined herein may be applied to other implementations without departing from the spirit or scope of this disclosure. Thus, the disclosure is not intended to be limited to the implementations shown herein but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations, unless otherwise stated.

Certain features that are described in this specification in the context of separate implementations also may be implemented in combination in a single implementation. Conversely, various features that are described in the context of a single implementation also may be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Additionally, other implementations are within the scope of the following claims. In some cases, the actions recited in the claims may be performed in a different order and still achieve desirable results.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A system for subscale testing of rocket injector stability, the system comprising:
    a chamber having a sidewall extending axially;
    an injector plate removably attached to an upstream end of the chamber, the injector plate structurally holding one or more injectors configured to inject one or more propellants into the chamber, the injector plate being one of a plurality of different injector plates configured to be removably attached to the chamber for interchanging the injector plate with a different injector plate of the plurality of different injector plates, the different injector plate structurally holding one or more different injectors; and a piston positioned at least partially within the chamber, the piston comprising a head on an upstream end thereof and an extension rod extending downstream from the head through a downstream exit of the chamber, wherein the piston is continuously moveable in an axial direction to continuously vary a combustion volume of the chamber located between the injector plate and the upstream end of the piston.

2. The system of claim 1, wherein the upstream end of the piston is rounded.

3. The system of claim 1, further comprising an actuator configured to axially move the piston.

4. The system of claim 1, wherein the piston further comprises a cooling channel.

5. The system of claim 4, further comprising a shell at the upstream end of the piston, wherein the cooling channel extends between the shell and the piston.

6. The system of claim 4, further comprising a shell at the upstream end of the piston, wherein the shell and the piston are monolithic.

7. The system of claim 1, wherein the piston and the sidewall of the chamber define a gap therebetween.

8. The system of claim 7, wherein the gap is an annular gap.

9. The system of claim 8, wherein the piston increases in cross-sectional area in a downstream direction from the upstream end of the piston to a maximum cross-sectional area at the annular gap.

10. The system of claim 9, wherein the piston decreases in cross-sectional area in the downstream direction from the annular gap.

11. The system of claim 1, further comprising a sensor configured to detect a pressure within the combustion volume.

12. The system of claim 1, further comprising a replaceable cavity ring forming part of the sidewall of the chamber.

13. A subscale rocket injector stability test system comprising:
a chamber;
a modular injector plate coupled to the chamber and comprising one or more injectors; and
a piston positioned at least partially within the chamber and configured to move to vary a combustion volume of the chamber, the piston comprising a head on an upstream end thereof and an extension rod extending downstream from the head through a downstream exit of the chamber, wherein the piston and a sidewall of the chamber define an annular flow path around the piston configured to act as a chokepoint allowing exhaust to exit the chamber.

14. The system of claim 13, wherein the head on the upstream end of the piston is bulbous.

15. The system of claim 13, wherein the piston further comprises a cooling channel extending at least partially within the extension rod coupled to the piston and at least partially within the piston.

16. The system of claim 13, wherein a volume defined between the piston and the sidewall defines an inverted nozzle shape.

17. The system of claim 13, further comprising an actuator configured to axially move the piston to continuously vary the combustion volume.

18. A method of subscale testing rocket injector stability, the method comprising:
injecting into a combustion chamber one or more propellants from one or more injectors supported by a modular injector plate to cause combustion;
continuously moving a piston within the combustion chamber to continuously vary a combustion volume within the combustion chamber with an extension rod of the piston moving through a downstream exit of the combustion chamber; and
detecting data from within the combustion volume as the piston moves.

19. The method of claim 18, further comprising flowing a coolant through a cooling channel within the piston.

20. The method of claim 18, further comprising replacing the modular injector plate with a different injector plate supporting one or more of different injectors.

21. The method of claim 18, further comprising flowing exhaust from the combustion volume through an annular gap located between the piston and a sidewall of the combustion chamber.

22. The method of claim 18, further comprising analyzing the data to assess the stability of the one or more injectors.

* * * * *